（12）United States Patent
Yuuki et al.

(10) Patent No.: US 8,860,356 B2
(45) Date of Patent: Oct. 14, 2014

(54) VARIABLE MAGNETIC FLUX MOTOR DRIVE SYSTEM

(75) Inventors: Kazuaki Yuuki, Tokorozawa (JP); Kazuto Sakai, Yokosuka (JP); Hiroshi Mochikawa, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 736 days.

(21) Appl. No.: 12/678,929

(22) PCT Filed: Sep. 16, 2008

(86) PCT No.: PCT/JP2008/066674
§ 371 (c)(1),
(2), (4) Date: Mar. 18, 2010

(87) PCT Pub. No.: WO2009/038047
PCT Pub. Date: Mar. 26, 2009

(65) Prior Publication Data
US 2010/0201294 A1    Aug. 12, 2010

(30) Foreign Application Priority Data

Sep. 18, 2007  (JP) ................. 2007-240833
Dec. 20, 2007  (JP) ................. 2007-328804

(51) Int. Cl.
| H02P 6/00 | (2006.01) |
| H02P 6/00 | (2006.01) |
| B60L 15/02 | (2006.01) |
| H02P 21/12 | (2006.01) |
| H02P 25/08 | (2006.01) |
| H02K 1/27 | (2006.01) |
| H02K 21/04 | (2006.01) |
| H02P 21/00 | (2006.01) |

(52) U.S. Cl.
CPC ........... *H02K 1/2766* (2013.01); *B60L 2200/26* (2013.01); *B60L 15/025* (2013.01); *Y02T 10/643* (2013.01); *H02P 21/12* (2013.01); *H02P 25/08* (2013.01); *Y02T 10/641* (2013.01); *H02K 21/046* (2013.01); *H02P 21/0089* (2013.01)
USPC ......................................... 318/718; 318/432

(58) Field of Classification Search
USPC ................................................. 318/432, 718
See application file for complete search history.

(56) References Cited

U.S. PATENT DOCUMENTS

| 6,570,358 | B2 * | 5/2003 | Nakatsugawa et al. ....... 318/727 |
| 7,411,370 | B2 * | 8/2008 | Kono ............................ 318/802 |
| 7,825,620 | B2 * | 11/2010 | Nakatsugawa et al. ....... 318/800 |
| 2001/0028460 | A1 | 10/2001 | Maris et al. |

(Continued)

FOREIGN PATENT DOCUMENTS

| JP | 5 304752 | 11/1993 |
| JP | 7 336980 | 12/1995 |

(Continued)

OTHER PUBLICATIONS

Machine translation of JP07336980.*

(Continued)

*Primary Examiner* — Kawing Chan
(74) *Attorney, Agent, or Firm* — Oblon, Spivak, McClelland, Maier & Neustadt, L.L.P.

(57) ABSTRACT

A variable magnetic flux motor drive system includes: a variable magnetic flux motor having a variable magnet which is a low-coercive permanent magnet; an inverter that drives the variable magnetic flux motor 1; an inverter as a magnetization unit which supplies a magnetization current for controlling a magnetic flux of the variable magnet; and a boosting unit boosting an input DC voltage to a predetermined target value to output it to the inverter. The variable magnetic flux motor drive system makes it possible to achieve size reduction and high efficiency, while securing a voltage required for supplying a magnetization current when controlling the magnetic flux of the variable magnet.

16 Claims, 24 Drawing Sheets

(56) References Cited

U.S. PATENT DOCUMENTS

| | | | |
|---|---|---|---|
| 2002/0116941 A1 | 8/2002 | Kim et al. | |
| 2002/0116961 A1 | 8/2002 | Kim et al. | |
| 2002/0117926 A1 | 8/2002 | Joong et al. | |
| 2006/0033402 A1 | 2/2006 | Kim et al. | |
| 2006/0138992 A1* | 6/2006 | Yamamoto | 318/727 |
| 2008/0079378 A1* | 4/2008 | Nakatsugawa et al. | 318/430 |
| 2008/0297097 A1* | 12/2008 | Lee et al. | 318/701 |
| 2010/0071971 A1* | 3/2010 | Tatematsu et al. | 180/65.8 |
| 2010/0201294 A1* | 8/2010 | Yuuki et al. | 318/400.3 |
| 2010/0327689 A1* | 12/2010 | Sakai et al. | 310/156.03 |
| 2010/0327787 A1* | 12/2010 | Sakai et al. | 318/400.09 |

FOREIGN PATENT DOCUMENTS

| | | |
|---|---|---|
| JP | 9-308020 A | 11/1997 |
| JP | 10 191700 | 7/1998 |
| JP | 2002 262488 | 9/2002 |
| JP | 2002 262493 | 9/2002 |
| JP | 2002 262494 | 9/2002 |
| JP | 2003 199382 | 7/2003 |
| JP | 2005 160183 | 6/2005 |
| JP | 2005-245125 A | 9/2005 |
| WO | 2005 093943 | 10/2005 |

OTHER PUBLICATIONS

Machine translation of JP 2003199382.*

Office Action issued Sep. 11, 2012, in Japanese Patent Application No. 2007-328804 with English translation.

Chinese Office Action issued Mar. 1, 2012 in Patent Application No. 200880107591.5 with English Translation.

Japanese Office Action issued Mar. 27, 2012 in Patent Application No. 2007-240833 with English Translation.

* cited by examiner

VARIABLE MAGNETIC FLUX MOTOR DRIVE SYSTEM

TECHNICAL FIELD

The present invention relates to a variable magnetic flux drive system provided with a variable magnetic flux motor having a variable magnet and an inverter for driving the variable magnetic flux motor.

BACKGROUND ART

Instead of conventional induction motors (IM motors), permanent magnet synchronous motors (PM motors), which have excellent efficiency and can be expected to be reduced in size and noise, have come to be widely used. For example, as drive motors for railway cars and electric cars, the PM motors have come to be utilized.

Since an IM motor generates a magnetic flux itself by an excitation current from a stator, it has a technical problem of causing a loss due to flowing of the excitation current.

On the other hand, since a PM motor a motor including a permanent magnet in its rotor to output a torque by utilizing its magnetic flux, it is free from such a problem in an IM motor. However, a PM motor generates an induced voltage (counter-electromotive voltage) corresponding to its rotational speed due to the permanent magnet. In a applied fields with its wide rotation range such as railway cars, automobiles and the like, it is necessary to satisfy a condition that its inverter for driving and controlling the PM motor is not damaged due to an induced voltage generated at the maximum rotational speed (an overvoltage). In order to satisfy this condition, it is necessary to increase voltage resistance of the inverter sufficiently, or, restrict, on the contrary, the magnetic flux of the permanent magnet included in the motor. Since the former action may affect its power supply, the latter action is often selected. When an amount of magnetic flux in such a case is compared with that of magnetic flux of an IM motor (an amount of gap magnetic flux generated by the excitation current in a case of an IM motor), their ratio may be about one to three. In this case, in order to generate the same amount of torque, it is necessary to supply a high (torque) current in a PM motor that generates a small amount of magnetic flux. Thus, when currents necessary to output the same amount of torque in a low speed range for an IM motor and a PM motor are compared, it is necessary to supply a higher current to a PM motor.

Hence, as compared with an IM motor, current capacity of an inverter for driving a PM motor increases. Moreover, in general, since switching frequency of a switching element included in the inverter is high at a low speed and its resulting loss increases depending its current, a large loss and heat will be generated at a low speed in a PM motor.

Since cooling owing to running wind is expected in respect to an electrical train, an inverter device is inevitably increased in size due to needs for enhancing its cooling performance in a case where a large loss might occur at a low speed. In contrast, although field weakening control might be performed in a case where its induced voltage is high, its efficiency is reduced due to superposition of excitation currents.

As described above, the PM motor has merits and demerits resulting from the inclusion of the magnet. As a motor, a PM motor has a larger number of merits, and this reduces its loss and size; on the other hand, when the PM motor is used in an electrical train, an electric car or the like in which variable speed control is performed, it has poor efficiency as compared with a conventional IM motor at some operating points.

Moreover, since an inverter is increased in its current capacity and loss, the device is increased in size. With respect to system's efficiency itself, its overall efficiency is improved by use of a PM motor because a side of the motor is dominant; on the other hand, it is undesirable that the increase in the size of the inverter becomes the demerit of the system.

In a patent document 1, disclosed is an AC motor for driving an electric car that increases efficiency of a system by an operation of the motor and an inverter at a high efficiency both in a low power operation and a high power operation. In the AC motor for driving an electric car, magnetic flux generated by a permanent magnet embedded in a magnetic field pole and, as required, the magnetic flux generated by an excitation coil produce magnetic field flux, and, according to the output of the motor, a generating source of the magnetic field flux switches between only the permanent magnet and both the permanent magnet and the excitation coil, and an excitation current is supplied through a rotary transformer.

Hence, the AC motor for driving an electric car can switch to an operation with the permanent magnet alone according to the output of the motor at the time of, for example, a low output, and thus increases its operation efficiency. Furthermore, since a motor voltage can be increased in a low speed range of the motor, it is possible to reduce the current and thereby the efficiency of the system can be enhanced due to reduction of a loss in copper of the motor winding wire and a loss produced in the inverter. These effects are advantageous particularly to electric cars which are often operated in a low/medium speed range, and it can be made possible to enhance the efficiency at which the current is used and to extend a running distance achieved by a single charge.

Moreover, since the AC motor for driving an electric car does not demagnetize the permanent magnet, it is possible not only to simplify the inverter control but also to protect the device by preventing an abnormal overvoltage. The rotary transformer can be reduced in size by being operated at a high frequency, and thus it is possible to reduce the motor and the entire system in size and weight.

Patent document 1: Japanese Patent Application Laid-open No. H05-304752

FIG. 25 is a block diagram showing an example of a permanent magnet reluctance motor drive system. This system is configured with a smoothing capacitor 102, a DC power supply 3, an inverter 4 that converts a DC power to an AC power and a permanent magnet reluctance motor 1a that is driven by the AC power of the inverter 4. The inverter 4 converts the DC power from the DC power supply 3 to the AC power and supplies it to the permanent magnet reluctance motor 1a.

The permanent magnet reluctance motor 1a operates at a higher efficiency than an induction motor, and is advantageously of a small size and a high output. Furthermore, the permanent magnet reluctance motor 1a is, since it can operate with its speed variable in a wide range, often used in an electric car or a hybrid car.

However, the efficiency of the permanent magnet reluctance motor varies depending on conditions for its rotational speed and torque. Thus, when the permanent magnet reluctance motor is used in a electrical train, an electric car, a hybrid car or the like, it does not always achieve optimum performance in all the operational range in terms of its torque and rotational speed, and some conditions are present on which the efficiency is poor.

Therefore, it is possible to utilize a variable magnetic flux drive system using a variable magnetic flux motor that can vary the magnetic flux of the magnet with the current of the inverter. Since this system can vary an amount of magnetic flux of the permanent magnet with a short-time magnetization current according to operational conditions, it can be expected that the efficiency is enhanced as compared with the conventional permanent magnet reluctance motor. Moreover, when the magnet is unnecessary, it is possible to minimize the induced voltage by reducing the amount of magnetic flux.

When the magnetization current is supplied through the variable magnetic flux motor, it is necessary to use a higher DC voltage that is input into the inverter as compared with a DC voltage used at the time of a normal operation. However, when a rotational speed of the variable magnetic flux motor is small, it is unnecessary to use the high voltage. Thus, when it is used in a device, such as an air conditioner, that can reduce the rotational speed for a short moment without problems, the magnetization is preferably performed at a reduced rotational speed. However, when the variable magnetic flux motor is used in a power source in an electrical train or an electric car, it is impossible to reduce the rotational speed each time of magnetizing, and this results in a problem.

Even when a high-voltage voltage source is initially used, a use of a secondary battery as the voltage source causes variations in the voltage at the time of charging and discharging, and thus the voltage required for the magnetization is not always provided reliably. Since a high voltage is needed only in a short time period of the magnetization, it is inefficient to initially use the high-voltage voltage source.

Any device or product usually has a plurality of operation modes in which a torque and a rotational speed are different. Under these different conditions, it is difficult for the conventional PM motor using the constant magnetic flux of a permanent magnet to keep the optimum state under all these conditions, and thus the efficiency of a system is reduced, noise is produced and other problems occur.

By contrast, since the variable magnetic flux drive system described above can vary the amount of magnetic flux of a permanent magnet, it can be expected that the efficiency is enhanced as compared with the conventional PM motor drive system with the fixed magnet. Furthermore, when the magnet is unnecessary, it is also possible to minimize the induced voltage by reducing the amount of magnetic flux.

DISCLOSURE OF THE INVENTION

An object of the present invention is to provide a variable magnetic flux motor drive system that can achieve a high efficient system.

Another object of the present invention is to reduce the size and increase the efficiency while securing a voltage required for supplying a magnetization current in order to control the magnetic flux of a variable magnet used in a permanent magnet motor.

Yet another object of the present invention is to reduce a loss and increase the efficiency even when products and devices using the variable magnetic flux motor have a plurality of operation modes in which the torque and the rotational speed are different.

According to one aspect of the present invention, there is provided a variable magnetic flux motor drive system including: a permanent magnet motor that includes a variable magnet that is a low-coercive permanent magnet; an inverter that drives the permanent magnet motor; a magnetization unit that supplies a magnetization current for controlling a magnetic flux of the variable magnet; and a boosting unit that boosts an input DC voltage to a predetermined target value and outputs it to the inverter.

With the variable magnetic flux motor drive system, since the magnetic flux of the variable magnet used in the permanent magnet motor is controlled, it is possible to achieve size reduction and high efficiency while securing a voltage required for supplying a magnetization current.

According to another aspect of the present invention, there is provided a variable magnetic flux motor drive system including: a permanent magnet motor that includes a variable magnet which is a low-coercive permanent magnet; an inverter that drives the permanent magnet motor; a magnetization unit that supplies a magnetization current for controlling a magnetic flux of the variable magnet; an operation mode management unit that selects one operation mode from among a plurality of operation modes; and a magnetic flux command computation unit that computes a target magnetic flux value of the variable magnet based on the operation mode selected by the operation mode management unit and generates a magnetic flux command corresponding to the magnetic flux value. The magnetization unit supplies a magnetization current corresponding to the magnetic flux command generated by the magnetic flux command computation unit to control the magnetic flux of the variable magnet.

With the variable magnetic flux motor drive system, even when it is applied to a device having a plurality of operation modes of different torques and numbers of revolutions, it is possible to select a magnetic flux value most suitable for each operation mode to achieve high efficiency and reduce noise.

BEST MODE(S) FOR CARRYING OUT THE INVENTION

Embodiments of a variable magnetic flux motor drive system of the present invention will be described below with reference to the accompanying drawings.

A variable magnetic flux motor serving as a permanent magnet synchronous motor will first be described.

Figure 1:
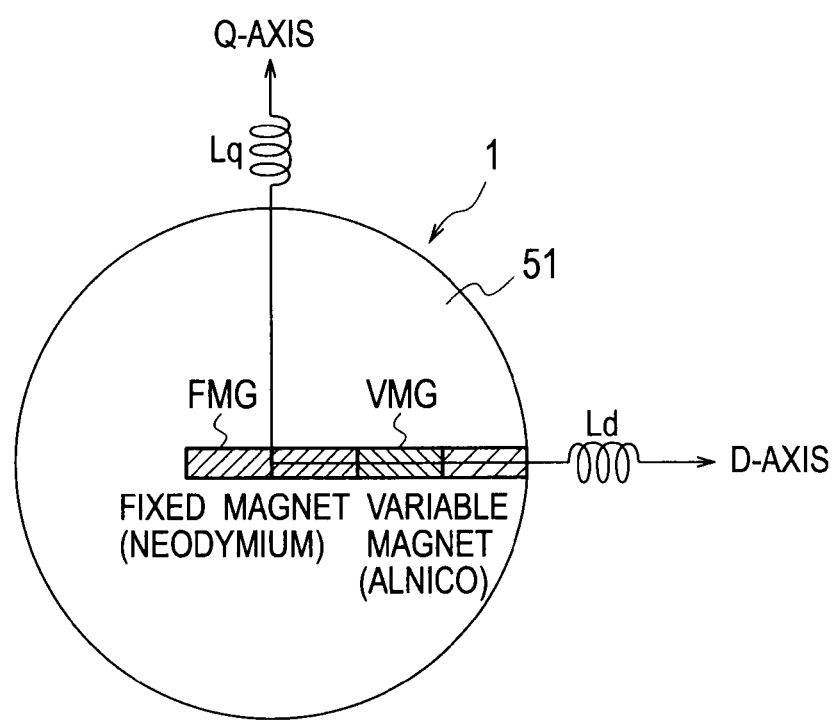
FIG. 1 is a diagram showing a simplified model of a variable magnetic flux motor.

FIG. 1 is a diagram showing a schematic model of a variable magnetic flux motor 1. A stator is similar to one used in a conventional motor. A rotor 51 includes: a fixed magnet FMG that serves as a permanent magnet and that has a fixed magnetic flux density of a magnetic body; and a variable magnet VMG that has a variable magnetic flux density of a magnetic body. The conventional PM motor has only the former fixed magnet FMG whereas the variable magnetic flux motor 1 of this embodiment also has the variable magnet VMG.

Here, fixed magnets and variable magnets will be described. Permanent magnets refer to magnets whose magnetized state is maintained when no current is supplied externally; under any condition, their magnetic flux density does not always remain the same. Even in the conventional PM motor, when an excessive amount of current is supplied from an inverter or the like thereto, the permanent magnet is demagnetized or, conversely, magnetized. Hence, the fixed magnet described above refers to a permanent magnet in which the amount of magnetic flux is not constantly maintained, and in which, in a state substantially similar to the state of the normal rated operation, its magnetic flux density is substantially maintained even when current is supplied from the inverter or the like. On the other hand, the variable magnet described above refers to a permanent magnet in which its magnetic flux density can be varied, even under the operational conditions, by the current supplied from the inverter or the like.

Such variable magnet can be designed in a moderate range, depending on the material and configuration of a magnetic body. For example, in the PM motor, a neodymium (NdFeB) magnet having a high residual magnetic flux density Br can be used. Since the neodymium magnet has a high residual magnetic flux density Br of about 1.2 T, even a small-sized device can output a large torque, and thus the neodymium magnet is suitable for a hybrid car (HEV) and a train, whose motors are required to produce a high output and to be reduced in size. Since the PM motor needs to prevent its magnet from being demagnetized by a normal amount of current, and the neodymium magnet (NdFeB) has an extremely high-coercive-force Hc of about 1000 kA/m, it is most suitable for the PM motor. This is because a magnet that has a high residual magnetic flux density and a high-coercive-force is selected for the PM motor.

Here, a magnetic body such as an alnico magnet (AlNiCo: Hc=60 to 120 kA/m) or a FeCrCo magnet (Hc=about 60 kA/m) that has a high residual magnetic flux density and a low coercive force Hc is used as the variable magnet. The magnetic flux density (the amount of magnetic flux) of the neodymium magnet is kept substantially constant by a normal amount of current (substantially equal to the amount of current fed by the inverter when the conventional PM motor is driven). On the other hand, the magnetic flux density (the amount of magnetic flux) of the variable magnet such as the alnico AlNiCo magnet is variable by the normal amount of current. Strictly speaking, since the neodymium magnet is utilized in a reversible region, its magnetic flux density varies within a narrow range, but the magnetic flux density returns to the initial value when the supply of the inverter current is stopped. On the other hand, since the variable magnet is utilized in an irreversible region, its magnetic flux density does not return to the initial value even when the supply of the inverter current is stopped.

In the variable magnetic flux motor 1 of FIG. 1, the amount of magnetic flux of the variable magnet (alnico magnet) VMG varies only in a D-axis direction, and is substantially zero in a Q-axis direction.

Figure 2:
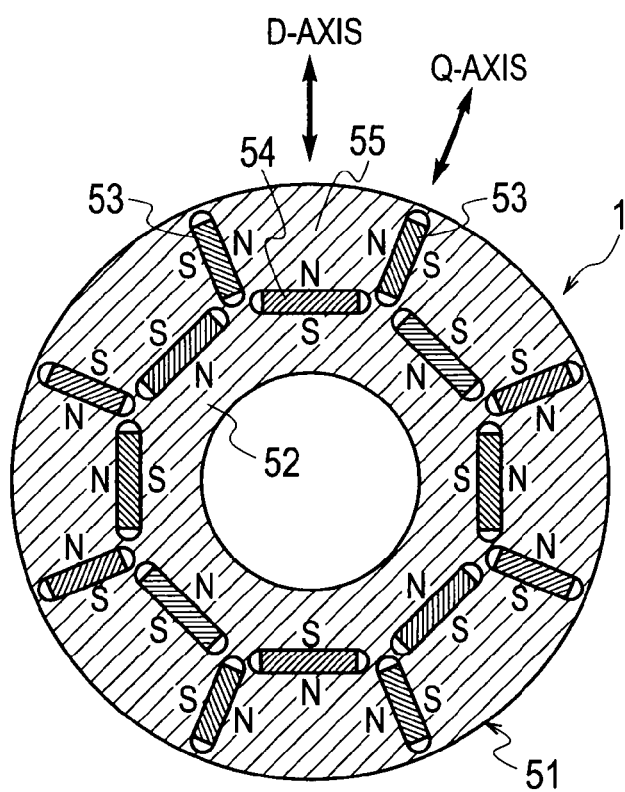
FIG. 2 is a cross-sectional view of the variable magnetic flux motor used in an embodiment of a variable magnetic flux motor drive system of the present invention.

FIG. 2 shows a specific example of the configuration of the variable magnetic flux motor 1. In the rotor 51, high-coercive-force magnets 54 such as a neodymium magnet (NdFeB) and low-coercive magnets 53 such as an alnico magnet (AlNiCo) are combined and arranged into a rotor core 52. The low-coercive magnets 53 serving as the variable magnet VMG are arranged on both sides of the magnetic pole 55 of the rotor core 52 in a radial direction. That is, the low-coercive magnet 53 is arranged in a boundary region between the adjacent magnetic poles 55. The high-coercive-force magnets 54 serving as the fixed magnet FMG are arranged in the magnetic poles 55 of the rotor core 52 in a direction perpendicular to the diameter of the rotor core 52. In the configuration described above, the direction in which the low-coercive permanent magnet (variable magnet VMG) 53 is magnetized is perpendicular to the Q-axis direction, and thus the low-coercive permanent magnet (variable magnet VMG) 53 is not affected by the current of the Q-axis and magnetized by the current of the D-axis.

Figure 3:
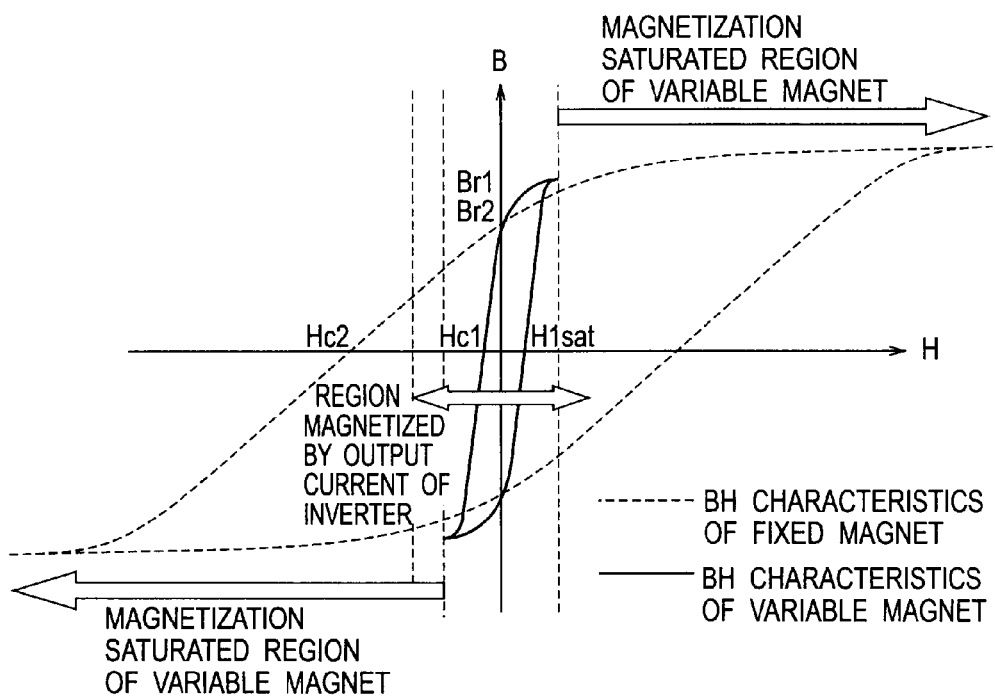
FIG. 3 is a diagram showing the BH characteristic of the variable magnetic flux motor of FIG. 2.
Figure 4:
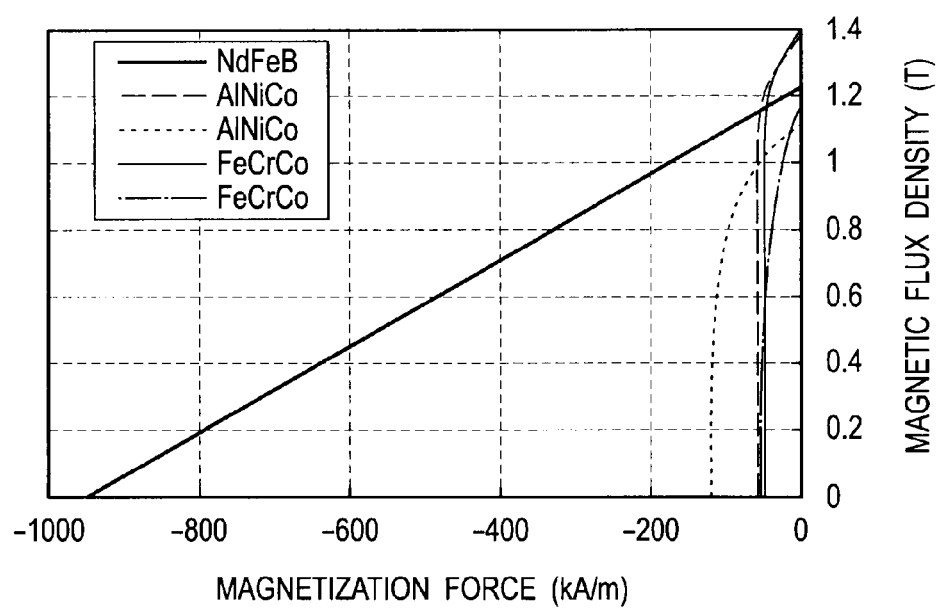
FIG. 4 is a diagram showing the BH characteristic of permanent magnets of various materials.

FIG. 3 shows an example of the BH characteristic (magnetic flux density–magnetization characteristic) of the fixed magnet and the variable magnet. FIG. 4 is a diagram showing only the second phenomenon of FIG. 3 in a quantitatively proper relationship. There is no significant difference between the residual magnetic flux density Br1 of the neodymium magnet and the residual magnetic flux density Br2 of the alnico magnet. However, with respect to the coercive force Hc2 of the neodymium magnet (NdFeB), the coercive force Hc1 of the alnico magnet (AlNiCo) is 1/15 to 1/8, and the coercive force Hc1 of the FeCrCo magnet is 1/15.

In the conventional PM motor drive system, a region magnetized by the output current of the inverter is sufficiently lower in coercive force than the neodymium magnet (NdFeB), and is utilized in the reversible region of its magnetization characteristic. However, since the coercive force of the variable magnet is low as described above, the irreversible region (where, even when the current value is changed to zero, its magnetic flux density does not return to the magnetic flux density B observed before the application of the current) can be utilized in the range of the output current of the inverter, and the magnetic flux density (the amount of magnetic flux) can be varied.

The equivalent simplified model for the dynamic characteristics of the variable magnetic flux motor 1 is shown in equation (1) below. This model is a model that is in a DQ axes rotating coordinate system where the direction of the magnetic flux of the magnet is the D-axis and a direction perpendicular to the D-axis is the Q-axis.

[Equation (1)]

$$\begin{bmatrix} Vd \\ Vq \end{bmatrix} = \frac{d}{dt} \times \begin{bmatrix} Ld & 0 \\ 0 & Lq \end{bmatrix} \times \begin{bmatrix} Id \\ Iq \end{bmatrix} + \begin{bmatrix} R1 & -\omega 1 \times Lq \\ \omega 1 \times Ld & R1 \end{bmatrix} \times \begin{bmatrix} Id \\ Iq \end{bmatrix} + \begin{bmatrix} 0 \\ \omega 1 \times (\Phi\text{fix} + \Phi\text{var}) \end{bmatrix} \quad (1)$$

Here, R1 represents a wire wound resistance, Ld represents a D-axis inductance, Lq represents a Q-axis inductance, Φfix represents the amount of magnetic flux of the fixed magnet, Φvar represents the amount of magnetic flux of the variable magnet, and ω1 represents the frequency of the inverter.

Figure 5:
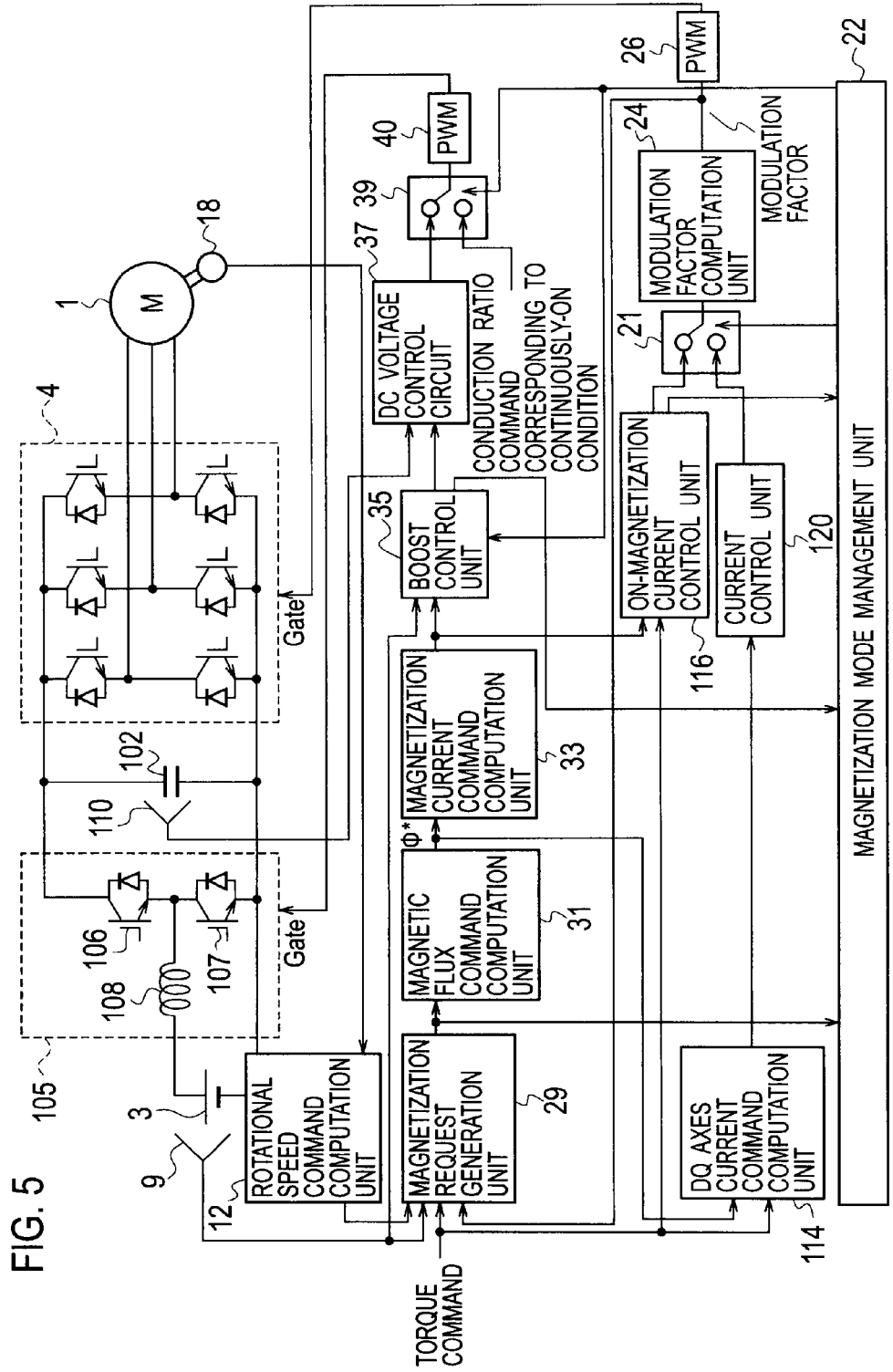
FIG. 5 is a block diagram showing the configuration of a first embodiment of the variable magnetic flux motor drive system of the present invention.

The main circuit of the variable magnetic flux motor drive system of this embodiment is shown in an upper portion of FIG. 5. The main circuit is configured with the variable magnetic flux motor 1, a smoothing capacitor 102, a DC power supply 3, an inverter 4 that converts a DC power to an AC power, and a boosting unit 105. The boosting unit 105 is a DC chopper in this embodiment, and is configured with a switch element 106, a switch element 107 and a reactor 108.

The variable magnetic flux motor 1 corresponds to the permanent magnet motor of the present invention, and includes the variable magnet (for example, the alnico magneto) that is a low-coercive permanent magnet.

The inverter 4 drives the variable magnetic flux motor 1. The inverter 4 serves as a magnetization unit that feeds a magnetization current for controlling the magnetic flux of the variable magnet included in the variable magnetic flux motor 1.

The boosting unit 105 is connected to the DC power supply 3, and boosts a DC voltage input from the DC power supply 3 to a predetermined target value to output it to the inverter 4. The boosting unit 105 performs the boost operation only at the time of the magnetization. Hence, before the start of the supply of the magnetization current by the inverter 4, the boosting unit 105 boosts the input DC voltage to the predetermined target value to output it to the inverter 4. The boosting unit 105 sets, as the predetermined target value, a voltage higher than that output to the inverter during normal operation. Thus, the voltage input to the inverter 4 is higher at the time of the magnetization than that at the time of the normal operation.

As shown in FIG. 5, the boosting unit 105 forms the DC chopper with the switch element 106, the switch element 107 and the reactor 108. Since the boosting unit 105 performs the boost operation only at the time of the magnetization as described above, during the normal operation, the switch element 106 is constantly on and the switch element 107 is constantly off. The operation of the boosting unit 105 will be described in detail later.

The DC power supply 3 may be a secondary battery that feeds a DC power to the boosting unit 105. When this system is applied to an electric car and the like, the DC power supply 3 is a secondary battery.

Figure 6:
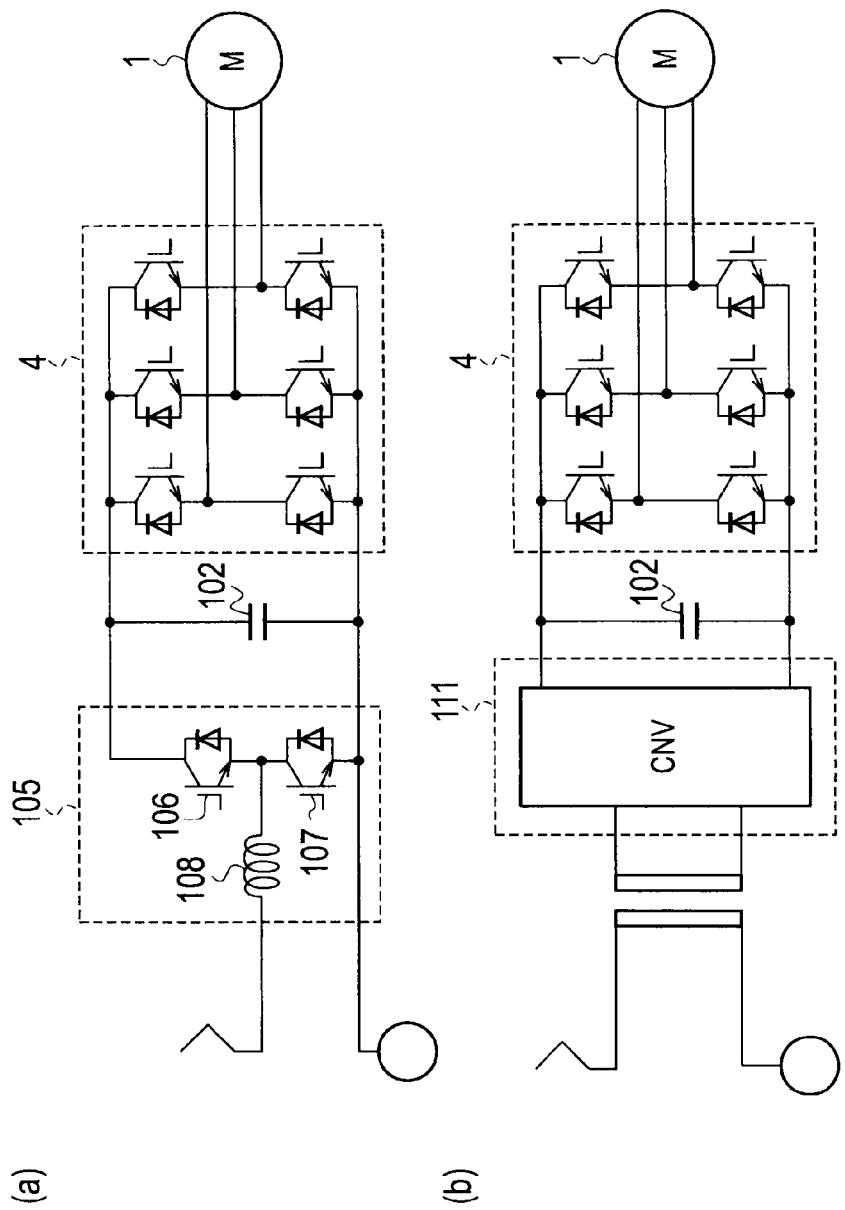
FIG. 6 is a diagram showing a variation when the main circuit of the first embodiment is applied to a train.

FIG. 6 is a diagram showing the configuration of the main circuit when the system is applied to a train. FIG. 6(a) shows the configuration when the system is applied to a DC train. The configuration of FIG. 6(a) differs from that of FIG. 5 in that the boosting unit 105 is connected to an overhead wire instead of the DC power supply 3. The overhead wire refers to an electrical wire for feeding power continuously by keeping contact with a power collection device of a train. The boosting unit 105 boosts a DC voltage obtained from the overhead wire to output it to the inverter 4. FIG. 6(b) shows the configuration when the system is applied to an AC train. The configuration of FIG. 6(b) differs from that of FIG. 5 in that, instead of the DC power supply 3, an overhead wire or a transformer for feeding an AC power is included and that, instead of the boosting unit 105, a converter 111 is included. The AC power from the overhead wire is output through the transformer to the converter 111. The converter 111 is an AC to DC converter, and can control a DC voltage. Thus, the converter 111 functions as the boosting unit, and boosts the DC voltage to the predetermined target value to output it to the inverter 4. A PWM-CNV (converter) that is conventionally used as the converter 111 in the AC train is one of the boosting circuits because it outputs a DC voltage higher than an input AC voltage. Hence, when this system is applied to the AC train, the boost control of the converter 111 has only to be performed at the time of the magnetization, thus making it easier to achieve the application.

A rotation angle sensor 18 for detecting the rotation angle of the variable magnetic flux motor 1, a voltage detector 9 for detecting the output voltage of the DC power supply 3 and a voltage detector 110 for detecting the output voltage of the boosting unit 105 are included in the main circuit.

In a lower portion of FIG. 5, in addition to the main circuit described above, the control circuit of the system is shown. The control circuit will now be described. The control circuit is configured with a rotational speed command computation unit 12, a DQ axes current command computation unit 114, an on-magnetization current control unit 116, a current control unit 120, a switch 21, a magnetization mode management unit 22, a modulation factor computation unit 24, a PWM circuit 26, a magnetization request generation unit 29, a magnetic flux command computation unit 31, a magnetization current command computation unit 33, a boost voltage command computation unit 35, a DC voltage control circuit 37, a switch 39 and a PWM circuit 40.

The rotational speed command computation unit 12 computes, based on a rotation angle detected by the rotation angle sensor 18, the rotational speed of the variable magnetic flux motor 1 to output it to the magnetization request generation unit 29.

The DQ axes current command computation unit 114 determines, based on a torque command and a magnetic flux command Φ*, a D-axis current command Id* and a Q-axis current command Iq*. Here, the general equation of a torque is expressed as equation (2) below, and Id and Iq are obtained and thus the D-axis current command Id* and the Q-axis current command Iq* are determined.

$$\text{Torque} = \Phi \times Iq + (Ld - Lq) \times Id \times Iq \qquad (2)$$

Here, Φ represents the total magnetic flux (=the magnetic flux of a fixed magnet+the magnetic flux of a variable magnet), Ld represents a D-axis inductance and Lq represents a Q-axis inductance. Thus, equation (2) is a function of the amount of magnetic flux and the like and torque. Since, in fact, Ld and Lq are nonlinear, the DQ axes current command computation unit 114 determines Id and Iq based on table data corresponding to the torque and the magnetic flux. Here, the DQ axes current command computation unit 114 determines Id and Iq such that a predetermined amount of torque is obtained with the minimum current value (($Id^2+Iq^2$)^(½)).

Based on the rotational speed and a torque command input from the rotational speed command computation unit 12, an output voltage (battery voltage) of the DC power supply 3 that is detected by the voltage detector 9 and information such as a modulation factor that is computed by the modulation factor computation unit 24, which will be described later, the magnetization request generation unit 29 determines whether or not it is necessary to vary the magnetic flux of the variable magnet, and outputs a magnetization request signal.

When the magnetic flux command computation unit receives the magnetization request signal from the magnetization request generation unit 29, it computes the amount of magnetic flux (the target amount of magnetic flux for the present variable magnetic flux or the total magnetic flux), and outputs it as the magnetic flux command Φ*. In general, it is necessary for the magnetic flux to be varied as described below. However, this is just an example, and the variation is not limited to this example.

First, when the rotational speed of the variable magnetic flux motor 1 is increased, the magnetic flux of the variable magnet is reduced. In the variable magnetic flux motor 1, as the rotational speed is increased, a counter-electromotive voltage is increased. Thus, the magnetic flux command computation unit 31 outputs the magnetic flux command Φ* for reducing the magnetic flux to reduce the counter-electromotive voltage.

Then, when the torque is increased by the torque command, the magnetic flux of the variable magnet is reduced. As the variable magnetic flux motor 1 has a higher torque, it has a higher motor terminal voltage. Thus, the magnetic flux command computation unit 31 outputs the magnetic flux command Φ* for reducing the magnetic flux to reduce the terminal voltage.

When the modulation factor computed by the modulation factor computation unit 24 is increased, the magnetic flux of the variable magnet is reduced. When the modulation factor is high, the output voltage of the inverter 4 is saturated, and thus it is necessary to perform field weakening control on the variable magnetic flux motor 1. Thus, the magnetic flux command computation unit 31 outputs the magnetic flux command Φ* for reducing the magnetic flux to reduce the counter-electromotive voltage, thereby making it possible to eliminate the need for the field weakening control.

When the output voltage (battery voltage) of the DC power supply 3 that is detected by the voltage detector 9 is reduced, the modulation factor is increased. Thus, for the above reason, the magnetic flux command computation unit 31 outputs the magnetic flux command Φ* for reducing the magnetic flux.

The magnetization current command computation unit 33 computes the required magnetization current based on the magnetic flux command Φ* input from the magnetic flux command computation unit 31. In general, the magnetization current depends on the magnetization history of the variable magnet from past to present. Hence, the magnetization current command computation unit 33 has, for example, table information on the past magnetization history and the requested magnetic flux, and refers to the table information to compute the magnetization current. The magnetization current command computation unit 33 outputs the magnetization current command based on the computed magnetization current.

The current control unit 120 calculates the output voltage command such that the D-axis current command Id* and the Q-axis current command Iq* generated by the DQ axes current command computation unit 114 agree with the D-axis current Id and the Q-axis current Iq, respectively. For example, the current control unit 120 performs PI control on current deviation to determine the DQ axes voltage command, and performs coordinate conversion to determine UVW phase voltages.

Here, when the magnetization is performed, the inverter 4 serving as the magnetization unit needs to accurately supply an excessive amount of magnetization current to the variable magnetic flux motor 1 in a short period of time. With the above-described PI control by the current control unit 120, it may be difficult to accurately supply the magnetization current in a short period of time because of insufficient responsiveness. To overcome this problem, in this embodiment, the on-magnetization current control unit 116 is provided, which performs the method of controlling the current such that the current responds in the minimum period based on a predetermined magnetization current command; this on-magnetization current control unit 116 controls the on-magnetization current.

The on-magnetization current control unit 116 calculates the output voltage command by utilizing, for example, an instantaneous comparison control mode such as a hysteresis comparator mode such that the torque command and the magnetization current computed by the magnetization current command computation unit 33 agree with the D-axis current Id and the Q-axis current Iq, respectively. When the magnetization is completed, the on-magnetization current control unit 116 outputs a magnetization current application completion flag that is set to high (H) to the magnetization mode management unit 22.

The on-magnetization current control unit 116 is a control unit that is unique to the variable magnetic flux motor drive system, but is not an essential element thereto.

The switch 21 selects the output voltage command of the on-magnetization current control unit 116 when the magnetization current application flag of the magnetization mode management unit 22 is high H (the magnetization current is applied), and outputs it to the modulation factor computation unit 24, whereas the switch 21 selects the output voltage command of the current control unit 120 when the magnetization current application flag is low L (the magnetization current is not applied) and outputs it to the modulation factor computation unit 24.

The modulation factor computation unit 24 computes the modulation factor based on the output voltage command of the on-magnetization current control unit 116 or the current control unit 120.

The PWM circuit 26 controls the turning on and off of the switching element of the inverter 4 based on the modulation factor computed by the modulation factor computation unit 24.

The boost control unit 35 determines the target voltage value of the output voltage of the boosting unit 105, and outputs a voltage command such that the present output voltage of the boosting unit 105 is gradually brought closer to the target voltage value.

Figure 7:
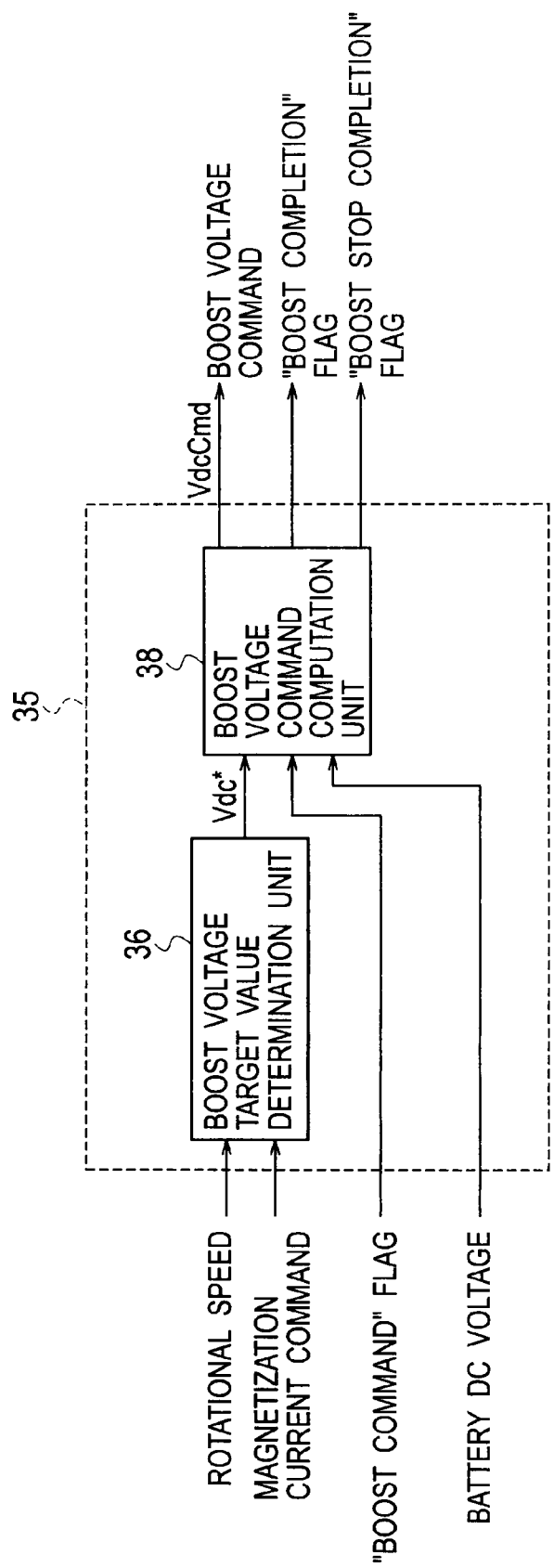
FIG. 7 is a diagram showing the detailed configuration of a boost control unit of the first embodiment.

FIG. 7 is a block diagram showing the detailed configuration of the boost control unit 35. As shown in FIG. 7, the boost control unit 35 is configured with a boost voltage target value determination unit 36 and a boost voltage command computation unit 38.

The boost voltage target value determination unit 36 functions as a calculation unit. The boost voltage target value determination unit 36 calculates the voltage target value based on at least one of the magnitude of the magnetization current supplied by the inverter 4, the rotational speed of the variable magnetic flux motor 1 and the magnetic flux required for the variable magnet. In this embodiment, the boost voltage target value determination unit 36 calculates the voltage target value based on the magnetization current computed by the magnetization current command computation unit 33 and the rotational speed computed by the rotational speed command computation unit 12. The rotational speed computed by the rotational speed command computation unit 12 is input to the boost voltage command computation unit 35 through the magnetization request generation unit 29, the magnetic flux command computation unit 31 and the magnetization current command computation unit 33. The specific method of calculating the voltage target value by the boost voltage target value determination unit 36 will be described later. Here, the voltage target value calculated by the boost voltage target value determination unit 36 is expressed as "Vdc*".

The boost voltage command computation unit 38 outputs a boost voltage command VdcCmd based on the output voltage (battery voltage) of the DC power supply 3 that is detected by the voltage detector 9, a boost command flag that is output from the magnetization mode management unit 22 and that will be described later and the voltage target value Vdc* calculated by the boost voltage target value determination unit 36. The boost voltage command computation unit 38 outputs a boost completion flag or a boost stop completion flag to the magnetization mode management unit 22 with appropriate timing.

The boosting unit 105 boosts the DC voltage input from the DC power supply 3 to the voltage target value calculated by the boost voltage target value determination unit 36, and outputs it to the inverter 4.

The DC voltage control circuit 37 controls the DC chopper, which is the boosting unit 105, based on the boost voltage command output from the boost control unit 35. The DC voltage control circuit 37 outputs the conduction ratio (0≤the conduction ratio≤1) of the DC chopper such that the output voltage (the input DC voltage of the inverter 4) of the boosting unit 105 which is detected by a voltage detector 10 agrees with the boost voltage command VdcCmd output from the boost control unit 35.

The switch 39 selects the conduction ratio of the DC voltage control circuit 37 when the magnetization mode flag of the magnetization mode management unit 22 is high H (performing the boost operation), whereas, when the magnetization mode flag is low L (performing no boost operation), the switch 39 outputs a conduction ratio (=1) such that the switch element 106 of the DC chopper is continuously-on (the switch element 107 is continuously-off).

The PWM circuit 40 generates, based on the conduction ratio output through the switch 39, a gate signal fed to the switch element 106 and the switch element 107, and controls the turning on and off of the switch element 106 and the switch element 107, respectively.

When the variable magnet is magnetized, the magnetization mode management unit 22 outputs various flags so that the boosting unit 105 boosts with appropriate timing. The detailed operation of the magnetization mode management unit 22 will be described later.

The action of this embodiment configured as described above will now be discussed. The case where the magnetization is not required will first be described. In this case, a command that is input is a torque command. This torque command is generated such that the variable magnetic flux motor 1 has a desired torque; the torque command is output by appropriate means. The DQ axes current command computation unit 114 generates, based on the input torque command, the D-axis current command Id* and the Q-axis current command Iq* to output them to the current control unit 120.

The current control unit 120 calculates the output voltage command such that the D-axis current Id and the Q-axis current Iq agree with the D-axis current command Id* and the Q-axis current command Iq*, respectively.

Here, since the magnetization is unnecessary, the magnetization current application flag of the magnetization mode management unit 22 is low (L). Thus, the switch 21 outputs the output voltage command output from the current control unit 120 to the modulation factor computation unit 24.

The modulation factor computation unit 24 computes the modulation factor based on the output voltage command calculated by the current control unit 120. The PWM circuit 26 controls the turning on and off of the switching element of the inverter 4 based on the modulation factor computed by the modulation factor computation unit 24.

In this case, the switch 39 outputs a conduction ratio of 1 because the magnetization mode flag of the magnetization mode management unit 22 is low (L). Hence, the PWM circuit 40 generates a gate signal fed to the switch element 106 and the switch element 107 such that the switch element 106 of the DC chopper is continuously-on (the switch element 107 is continuously-off), and controls the turning on and off of the switch element 106 and the switch element 107, respectively. As described above, when the magnetization is not required, the switch element 106 is continuously-on (the switch element 107 is continuously-off), and thus no switching loss is produced in the switch elements, and only a slight loss resulting from harmonics is produced in the reactor 108.

Figure 8:
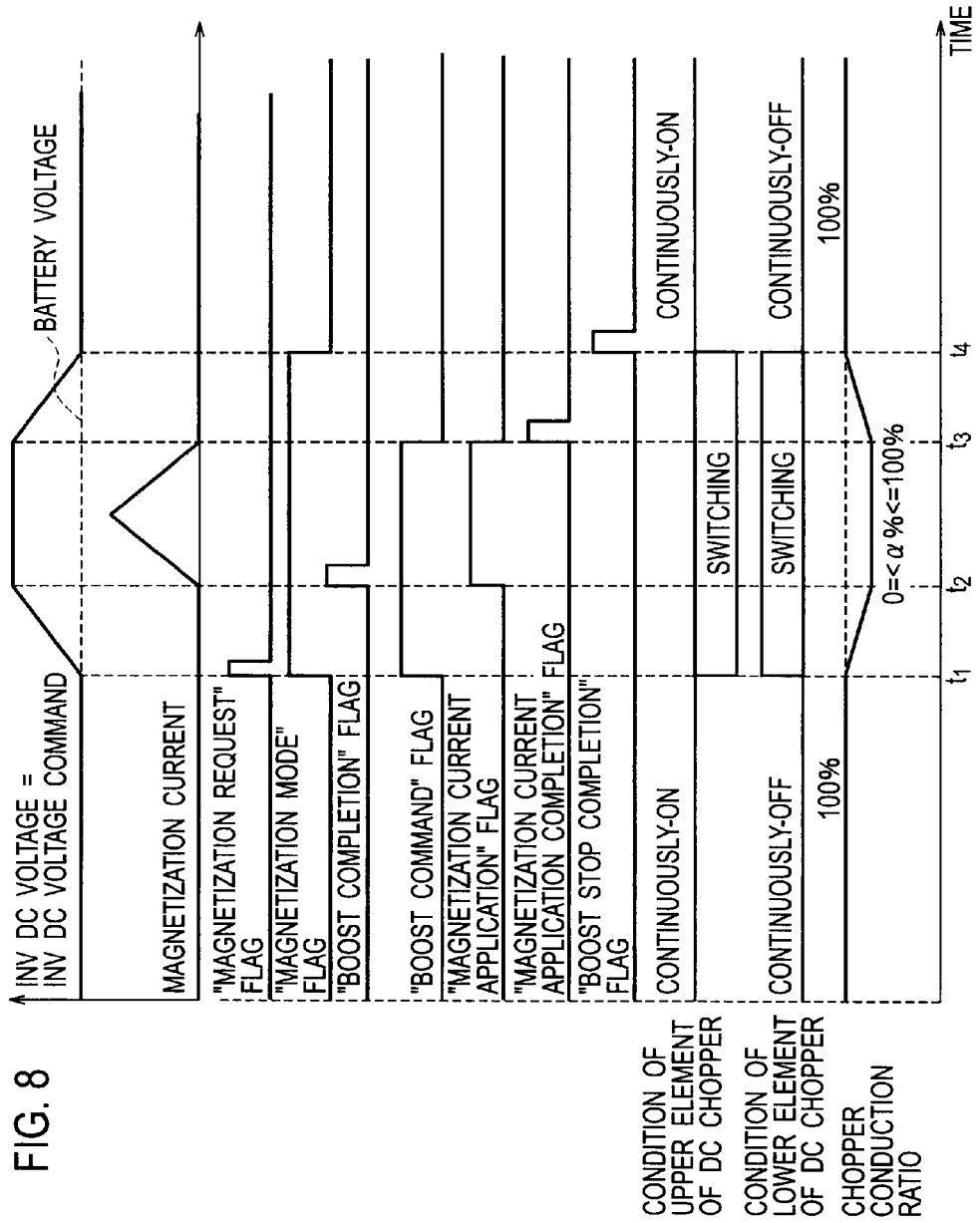
FIG. 8 is a time chart showing the states of individual units of the variable magnetic flux motor drive system when magnetization is performed in the first embodiment.

The case where the magnetization is required will now be described. FIG. 8 is a time chart showing the states of individual units of the variable magnetic flux motor drive system when the magnetization is performed. The same operation as in the above case where the magnetization is not required is performed until time t1. The conduction ratio of the DC chopper that is the boosting unit 105 is one (100%) until time t1.

At time t1, the magnetization request generation unit 29 determines that the magnetic flux of the variable magnet needs to be varied, and outputs a magnetization request signal. This magnetization request signal is input to the magnetic flux command computation unit 31 and the magnetization mode management unit 22.

The magnetization request signal is input, as the high (H) magnetization request flag, to the magnetization mode management unit 22. Here, the magnetization mode management unit 22 sets the magnetization mode flag and the boost command flag to high (H). This magnetization mode flag is kept high (H) until the completion of the magnetization and the boost operation.

The magnetization mode management unit 22 outputs the high (H) boost command flag to the boost control unit 35, and the high (H) magnetization mode flag to the switch 39. Thus, the switch 39 selects the conduction ratio of the DC voltage control circuit 37, and outputs it to the PWM circuit 40.

When the magnetic flux command computation unit receives the magnetization request signal from the magnetization request generation unit 29, it computes the amount of magnetic flux (the target amount of magnetic flux for the present variable magnetic flux or the total magnetic flux), and outputs it as the magnetic flux command Φ* to the magnetization current command computation unit 33 and the DQ axes current command computation unit 114.

The magnetization current command computation unit 33 computes the required magnetization current based on the magnetic flux command Φ* input from the magnetic flux command computation unit 31, and outputs it as the magnetization current command to the boost control unit 35 and the on-magnetization current control unit 116. Here, the magnetization current command computation unit 33 also outputs information on the rotational speed of the variable magnetic flux motor 1 to the boost control unit 35.

The magnetization current command and the information on the rotational speed output from the magnetization current command computation unit 33 are input to the boost voltage target value determination unit 36 within the boost control unit 35.

The boost voltage target value determination unit 36 calculates the voltage target value according to the magnetization current command and based on the magnitude of the magnetization current supplied by the inverter 4 and the rotational speed of the variable magnetic flux motor 1. The method of determining the voltage target value by the boost voltage target value determination unit 36 will now be described. The input DC voltage of the inverter 4 required for the magnetization increases with the rotational speed of the variable magnetic flux motor 1, and also increases with the magnetization current (the absolute value thereof).

Hence, when the boost voltage target value determination unit 36 calculates the voltage target value based on the magnitude of the magnetization current supplied by the inverter 4, it calculates a higher voltage target value as the magnetization current becomes higher. When the boost voltage target value determination unit 36 calculates the voltage target value based on the rotational speed of the variable magnetic flux motor 1, it calculates a higher voltage target value as the rotational speed of the variable magnetic flux motor 1 becomes larger.

Figure 9:
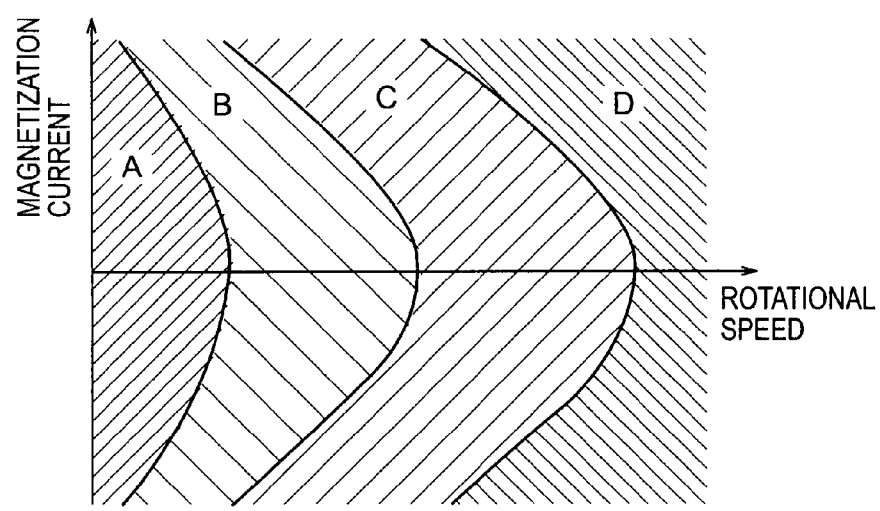
FIG. 9 is a diagram showing an example of a method of determining a voltage target value by a boost voltage target determination unit of the first embodiment.

FIG. 9 is a diagram showing an example of the method of determining a voltage target value by the boost voltage target determination unit 36. As shown in FIG. 9, the boost voltage target value determination unit 36 calculates the four levels of voltage target values according to the magnitude of the magnetization current based on the magnetization current command and the rotational speed of the variable magnetic flux motor 1.

In FIG. 9, the four levels of voltage target values are determined so as to correspond to four regions. Here, the voltage target values correspond to regions A, B, C and D in increasing order of the values. For example, the voltage target value corresponding to region A is 125 volts, the voltage target value corresponding to region B is 150 volts, the voltage target value corresponding to region C is 175 volts and the voltage target value corresponding to region D is 200 volts.

For example, when a position that is determined according to the rotational speed and the magnitude of the magnetization current is located within region A, the voltage target value is 125 volts.

As obvious from FIG. 9, the boost voltage target value determination unit 36 calculates a higher voltage target value as the magnetization current supplied by the inverter 4 becomes higher. The boost voltage target value determination unit 36 calculates a higher voltage target value as the rotational speed of the variable magnetic flux motor 1 becomes larger.

Irrespective of the output voltage of the DC power supply 3 and the output voltage (the DC voltage input to the inverter 4) of the boosting unit 105 at that time point, the boost voltage target value determination unit 36 calculates the voltage target value Vdc* required for the magnetization, and outputs it to the boost voltage command computation unit 38.

Based on the output voltage (battery voltage) of the DC power supply 3 that is detected by the voltage detector 9, the boost command flag that is output from the magnetization mode management unit 22 and the voltage target value Vdc* calculated by the boost voltage target value determination unit 36, the boost voltage command computation unit 38 outputs the boost voltage command VdcCmd. Here, since the boost command flag is high (H), the boost voltage command computation unit 38 first determines whether or not the voltage Vdc detected by the voltage detector 9 is equal to or larger than the voltage target value Vdc* calculated by the boost voltage target value determination unit 36. If already Vdc≥Vdc*, the boost operation is completed, and thus the boost voltage command computation unit 38 outputs the boost completion flag to the magnetization mode management unit 22.

Since the boost operation is not completed at time t1 in FIG. 8, the boost voltage command computation unit 38 outputs the boost voltage command VdcCmd so that the voltage is gradually increased to the voltage target value Vdc*.

The DC voltage control circuit 37 controls the boosting unit 105 (the DC chopper) based on the boost voltage command VdcCmd output from the boost voltage command computation unit 38. The DC voltage control circuit 37 outputs the conduction ratio (0≤conduction ratio≤1) of the DC chopper such that the output voltage (the DC voltage input to the inverter 4) of the boosting unit 105 that is detected by the voltage detector 10 agrees with the boost voltage command VdcCmd output from the boost control unit 35.

Since the magnetization mode flag of the magnetization mode management unit 22 is high (H), the switch 39 selects the conduction ratio of the DC voltage control circuit 37, and outputs it to the PWM circuit 40.

The PWM circuit 40 generates, based on the conduction ratio that is output through the switch 39 from the DC voltage control circuit 37, a gate signal fed to the switch element 106 and the switch element 107, and controls the turning on and off of the switch element 106 and the switch element 107, respectively.

The boosting unit 105 boosts the DC voltage input from the DC power supply 3 to the voltage target value calculated by the boost voltage target value determination unit 36, and outputs it to the inverter 4.

Since the boost operation is not completed yet at time t1, the magnetization mode management unit 22 outputs the low (L) magnetization current application flag. Thus, the switch 21 selects the output voltage command of the current control unit 120, and outputs it to the modulation factor computation unit 24.

When the boost operation is completed at time t2, the boost voltage command computation unit 38 sets the boost completion flag to high (H), and outputs it to the magnetization mode management unit 22. Based on the input boost completion flag, the magnetization mode management unit 22 sets the magnetization current application flag for starting the application of the magnetization current to high (H), and outputs it to the switch 21.

The on-magnetization current control unit 116 calculates the output voltage command such that the torque command and the magnetization current computed by the magnetization current command computation unit 33 agree with the D-axis current Id and the Q-axis current Iq. Since the magnetization current application flag is high (H), the switch 21 selects the output voltage command of the on-magnetization current control unit 116, and outputs it to the modulation factor computation unit 24.

The modulation factor computation unit 24 computes the modulation factor based on the output voltage command calculated by the on-magnetization current control unit 116, and outputs it to the PWM circuit 26. The PWM circuit 26 controls, based on the modulation factor computed by the modulation factor computation unit 24, the turning on and off of the switching element of the inverter 4.

When the application of the magnetization current is completed at time t3, the on-magnetization current control unit 116 sets the magnetization current application completion flag to low (L), and outputs it to the magnetization mode management unit 22. The magnetization mode management unit 22 sets the boost command flag to low (L), and outputs it to the boost control unit 35, and it also sets the magnetization current application flag to low (L), and outputs it to the switch 21. Thus, the switch 21 selects the output voltage command of the current control unit 120, and outputs it to the modulation factor computation unit 24.

Since the boost command flag is low (L), the boost voltage command computation unit 38 within the boost control unit 35 outputs the boost voltage command VdcCmd for gradually decreasing the voltage to the output voltage of the DC power supply 3 detected by the voltage detector 9.

When the output voltage (the voltage input to the inverter 4) of the boosting unit 105 decreases to the output voltage value of the DC power supply 3, and the stop of the boost operation is completed at time t4, the boost voltage command computation unit 38 sets the boost stop completion flag to high (H), and outputs it to the magnetization mode management unit 22. The magnetization mode management unit 22 sets the magnetization mode flag to low (L), and outputs it to the switch 39. Thus, the switch 39 outputs, to the PWM circuit 40, a conduction ratio of one for keeping the switch element 106 of the DC chopper continuously-on (the switch element 107 is continuously-off).

Figure 10:
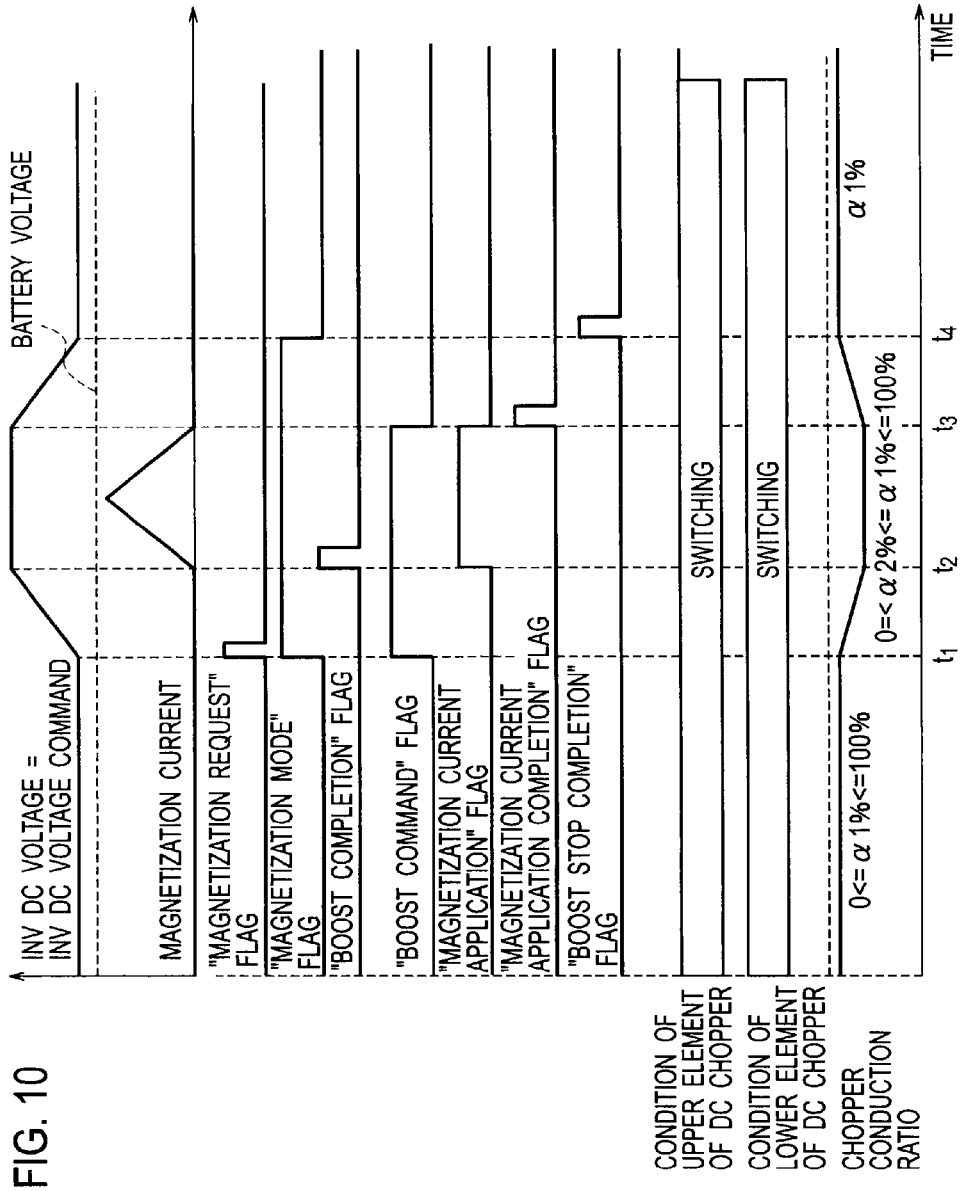
FIG. 10 is another time chart showing the states of the individual units of the variable magnetic flux motor drive system when the magnetization is performed in the first embodiment.

FIG. 10 is another time chart showing the states of the individual units of the variable magnetic flux motor drive system when the magnetization is performed. In the case shown in FIG. 10, the boosting unit 105 (the DC chopper) performs the switching operation even when the boost operation is not performed (during normal operation), and changes the duty ratio for the switching to perform the boost operation when the supply of the magnetization current is required. In this case, the conduction ratio of the DC chopper is less than one (=100%) even when the boost operation is not performed. Even with this configuration, it is possible for the variable magnetic flux motor drive system to secure the required voltage for the magnetization.

However, the boosting unit 105 of the variable magnetic flux motor drive system shown in FIG. 8 performs the switching operation only when the input DC voltage for starting the supply of the magnetization current by the inverter 4 is boosted to the predetermined target value. When it is not boosted (during normal operation), the DC chopper constantly keeps the switch element 106 continuously-on (keeps the switch element 107 continuously-off), and thus the switching loss is reduced. During the normal operation, a harmonic current does not flow, and thus only a slight loss is produced in the reactor 108.

When the DC chopper of the boosting unit 105 performs the switching operation, the switching frequency thereof may be set higher than that of the inverter 4. When the switching frequency of the DC chopper of the boosting unit 105 is set sufficiently higher, a current harmonic is reduced, and thereby heat produced in the reactor 108 is reduced. Thus, it is possible to reduce the size of the reactor 108 and hence to reduce the size of the DC chopper circuit.

As described above, the variable magnetic flux motor drive system of this embodiment uses the variable magnetic flux motor that can vary the magnetic flux of the magnet with the current of the inverter 4, it is possible to vary, according to the operation conditions, the amount of magnetic flux of the permanent magnet with the short-time magnetization current, and thus the enhancement of the efficiency can be expected. When the magnet is unnecessary, it is possible to minimize the induced voltage by reducing the amount of magnetic flux. Furthermore, it is possible to provide the variable magnetic flux motor drive system that can achieve size reduction and high efficiency while securing a voltage required to flow the magnetization current to control the magnetic flux of the variable magnet used in the variable magnetic flux motor 1.

When a secondary battery is used as the DC power supply 3, the output voltage of the secondary battery may vary. In particular, the output voltage is greatly affected by a voltage drop caused by the passage of current through the internal resistor of the secondary battery at the time of charging and discharging. Hence, the DC power supply 3 (secondary battery) may reach the voltage required to supply the magnetization current or fail to reach it. However, since the variable magnetic flux motor drive system of this embodiment includes the boosting unit 105, it is possible to secure the voltage required for the magnetization in either case.

Since the voltage input to the inverter 4 is boosted by the boosting unit 105, it is necessary to design the inverter 4 in consideration of the withstand voltage of the inverter 4 against the boosted voltage. However, in the conventional system shown in FIG. 25 where the secondary battery (the DC power supply 3) is directly connected to the inverter 4 in a series mode, the battery voltage varies by about 50%. Hence, the inverter 4 is designed in consideration of the withstand voltage against such variations. Therefore, even when the boosting unit 105 is additionally provided so that the variable magnetic flux motor drive system of this embodiment is applied, there is an advantage of enabling to reduce the cost without the need to increase the withstand voltage of the inverter 4. Thus, the variable magnetic flux motor drive system of this embodiment is suitable for the series mode including a secondary battery. In particular, an inverter that is used in a device, such as an electric car, which is intended to be driven by a battery is designed in consideration of the withstand voltage against voltage variations, and thus the system of this embodiment is suitably applied thereto.

The boosting unit 105 completes boosting the voltage input to the inverter 4 before the start of the supply of the magnetization current, and thus it is possible to efficiently and reliably supply the magnetization current by the use of the inverter 4.

Moreover, since the boosting unit 105 sets, as the predetermined target value, a voltage higher the voltage output to the inverter 4 during normal operation, and performs the boost operation, it is possible to suppress the voltage input to the inverter 4 except when the magnetization current is supplied from the inverter 4, and to reduce a loss in the inverter 4.

Furthermore, since the boost control unit 35 calculates the voltage target value according to the rotational speed of the variable magnetic flux motor 1 and the magnetization current command from the magnetization current command computation unit 33 and based on the magnitude of the magnetization current supplied by the inverter 4, it is possible to appropriately set the voltage target value. Thus, it is possible to prevent a loss caused by unnecessarily boosting the voltage.

The magnetization current command output from the magnetization current command computation unit 33 is determined based on the magnetic flux command Φ* indicating the required magnetic flux for the variable magnet, the boost control unit 35 can also calculate the voltage target value based on the required magnetic flux for the variable magnet. In this case, it is also possible to obtain the same effect.

The boost voltage target value determination unit 36 within the boost control unit 35, when calculating the voltage target value based on the magnitude of the magnetization current supplied by the inverter 4, calculates a higher voltage target value as the magnetization current is higher. Thus, it is possible to boost the voltage input to the inverter 4 to a voltage value suitable for the required magnetization current. Moreover, the boost voltage target value determination unit 36, when calculating the voltage target value based on the rotational speed of the variable magnetic flux motor 1, calculates a higher voltage target value as the rotational speed of the variable magnetic flux motor 1 is higher. Thus, it is possible to boost the voltage input to the inverter 4 to a voltage value suitable for the rotational speed.

Since the boosting unit 105 is the DC chopper that is configured with a switch terminal 6, a switch terminal 7 and the reactor 108, it is possible to appropriate perform the boost operation with a simplified configuration and to reduce the cost.

Since the DC chopper of the boosting unit 105 performs the switching operation only when the boost operation is performed, and keeps the switch element 106 continuously-on (keeps the switch element 107 continuously-off) when the boost operation is not performed (during normal operation), it is possible to reduce a switching loss. The harmonic current does not flow during normal operation, and thus only a slight loss is produced in the reactor 108. Hence, since only a small amount of heat is produced in the boosting unit 105, it is only necessary to dissipate only instant heat produced in a short time during the switching, in the design of a cooling structure of the switching element used in the DC chopper, thus eliminating the need for a large cooling structure, and making it possible to reduce the size of the boosting unit 105.

When the DC chopper of the boosting unit 105 has sufficiently high switching frequency (for example, the switching frequency higher than that of the inverter 4), ripples attributable to the switching operation of the switch element 106 and the switch element 107 are reduced. Hence, since a harmonic through the reactor 108 can be reduced, it is possible to reduce a loss in the reactor 108 and prevent heat. Moreover, the reduction of the ripples can decrease the inductance of the reactor 108, and thus it is possible to reduce the size of the boosting unit 105.

It is especially effective to set the switching frequency high. Since, as described above, the boost operation is performed with the DC chopper only during the magnetization, only a small amount of heat and a slight loss are produced in the switching elements during normal operation. Hence, in the DC chopper of this embodiment, even when the switching frequency is set high at the time of the switching operation and thus a small amount of heat and a slight loss are produced, this does not cause a problem and it is possible to reduce ripples.

Figure 11:
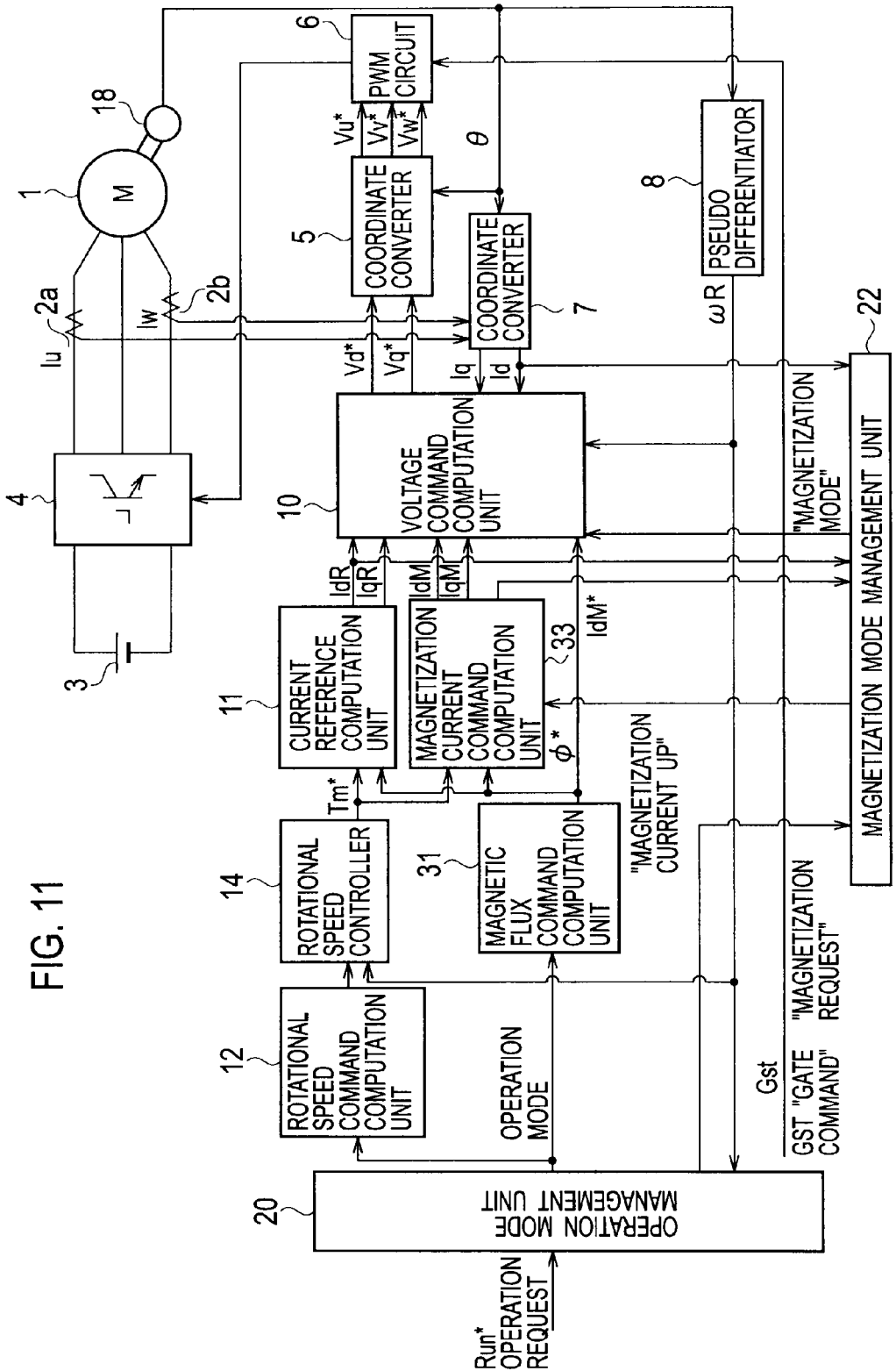
FIG. 11 is a block diagram showing the configuration of a second embodiment of the variable magnetic flux motor drive system of the present invention.

A second embodiment will now be described. A variable magnetic flux motor drive system shown in FIG. 11 is configured with the variable magnetic flux motor 1, current detectors 2a and 2b, the DC power supply 3, the inverter 4 that converts a DC power into an AC power, a coordinate converter 5, a PWM circuit 6, a coordinate converter 7, a pseudo differentiator 8, a voltage command computation unit 10, a current reference computation unit 11, the rotational speed command computation unit 12, a rotational speed controller 14, a rotation angle sensor 18, an operation mode management unit 20, the magnetization mode management unit 22, the magnetic flux command computation unit 31 and the magnetization current command computation unit 33.

The variable magnetic flux motor drive system can be divided into a main circuit and a control circuit. The DC power supply 3, the inverter 4, the variable magnetic flux motor 1, the current detectors 2a and 2b for detecting a motor current and the rotation angle sensor 18 for detecting the rotation angle of the variable magnetic flux motor 1 constitute the main circuit. The coordinate converter 5, the PWM circuit 6, the coordinate converter 7, the pseudo differentiator 8, the voltage command computation unit 10, the current reference computation unit 11, the rotational speed command computation unit 12, the rotational speed controller 14, the operation mode management unit 20, the magnetization mode management unit 22, the magnetic flux command computation unit 31 and the magnetization current command computation unit 33 constitute the control circuit.

The variable magnetic flux motor 1 is a permanent magnet motor, and includes a variable magnet (for example, an alnico magnet) which is a low-coercive permanent magnet.

The inverter 4 drives the variable magnetic flux motor 1. Specifically, the inverter 4 converts a DC power from the DC power supply 3 into an AC power, and supplies it to the variable magnetic flux motor 1. Currents Iu and Iw supplied to the variable magnetic flux motor 1 are detected by the current detectors 2a and 2b, and are input to the coordinate converter 7. The coordinate converter 7 converts the currents Iu and Iw into the D-axis current Id and the Q-axis current Iq, and outputs them to the voltage command computation unit 10. The inverter 4 also serves as the magnetization unit, and supplies the magnetization current for controlling the magnetic flux of the variable magnet of the variable magnetic flux motor 1.

The DC power supply 3 may be a secondary battery that supplies a DC power to the inverter 4. When this system is applied to an electric car or the like, the DC power supply 3 is the secondary battery.

The rotor rotation angle of the variable magnetic flux motor 1 is detected by the rotation angle sensor 18, and is output to the pseudo differentiator 8.

The control circuit will now be described. An operation command Run* is input to the control circuit. This operation command Run* is an operation request for the variable magnetic flux motor 1, and is input by appropriate means.

Based on the operation command Run* and a rotor rotation frequency ωR, the operation mode management unit 20 selects one operation mode from among a plurality of operation modes. Here, the pseudo differentiator 8 outputs the rotor rotation frequency ωR obtained by differentiating the rotation angle detected by the rotation angle sensor 18 to the rotational speed controller 14, the voltage command computation unit 10 and the operation mode management unit 20. The operation mode management unit 20 can recognize the output frequency of the inverter 4 based on the rotor rotation frequency ωR output by the pseudo differentiator 8. The operation mode management unit 20 outputs the selected operation mode to the rotational speed command computation unit 12 and the magnetic flux command computation unit 31. The operation mode management unit 20 also outputs a gate command Gst to the PWM circuit 6. When the magnetization is required to, for example, change the operation mode, the operation mode management unit 20 sets a "magnetization request" flag, and outputs it to the magnetization mode management unit 22.

The rotational speed command computation unit 12 computes, based on the operation mode selected by the operation mode management unit 20, the target rotational speed of the variable magnetic flux motor 1, and outputs, to the rotational speed controller 14, a rotation number command corresponding to the computation result.

Based on the rotational speed command output from the rotational speed command computation unit 12 and the rotor rotation frequency ωR output from the pseudo differentiator 8, the rotational speed controller 14 outputs a torque command Tm* which is generated such that the variable magnetic flux motor 1 produces a desired torque.

The magnetic flux command computation unit 31 computes the target magnetic value of the variable magnet based on the operation mode selected by the operation mode management unit 20, and generates the magnetic flux command Φ* corresponding to the target magnetic flux value. The inverter (magnetization unit) 4 controls the magnetic flux of the variable magnet by supplying the magnetization current according to the magnetic flux command generated by the magnetic flux command computation unit 31.

Specifically, the operation mode management unit 20 selects the operation mode according to the variation in the required magnetic flux for the present variable magnetic flux or the total magnetic flux (=the magnetic flux of the fixed magnet+the magnetic flux of the variable magnet). In general, it is necessary for the magnetic flux to be varied as described below. However, this is just an example, and the variation is not limited to this example.

When the rotational speed of the variable magnetic flux motor 1 is increased, the operation mode management unit 20 selects the operation mode for decreasing the magnetic flux of the variable magnet. As the rotational speed of the variable magnetic flux motor 1 is higher, the counter-electromotive voltage is increased. Hence, the magnetic flux command computation unit 31 outputs the magnetic flux command Φ* for decreasing the magnetic flux based on the operation mode to reduce the counter-electromotive voltage.

When the operation mode is selected in which the torque needs to be increased, the magnetic flux of the variable magnet is reduced. The variable magnetic flux motor 1 has a higher motor terminal voltage as the torque is higher. Hence, the magnetic flux command computation unit 31 outputs the magnetic flux command Φ* for decreasing the magnetic flux based on the operation mode to reduce the terminal voltage.

The magnetic flux command computation unit 31 can compute the target magnetic flux value of the variable magnet and generate the magnetic flux command corresponding to the target magnetic flux value according to the operation mode selected by the operation mode management unit 20 and based on at least one of efficiency improvement information, safety improvement information and noise improvement information for the variable magnetic flux motor drive system. In this case, the magnetic flux command computation unit 31 has in advance at least one of the efficiency improvement information, the safety improvement information and the noise improvement information for the variable magnetic flux motor drive system, and utilizes the information to compute the magnetic flux value most suitable for the selected operation mode.

Based on the torque command Tm* output from the rotational speed controller 14 and the magnetic flux command Φ* output from the magnetic flux command computation unit 31, the current reference computation unit 11 computes a D-axis current reference IdR and a Q-axis current reference IqR. Here, the general equation of a torque is expressed as equation (2) below, and Id and Iq are obtained and thus the D-axis current reference IdR and the Q-axis current reference IqR are determined.

$$\text{Torque} = \Phi \times Iq + (Ld - Lq) \times Id \times Iq \quad (2)$$

Here, Φ represents the total magnetic flux (=the magnetic flux of a fixed magnet+the magnetic flux of a variable magnet), Ld represents a D-axis inductance, and Lq represents a Q-axis inductance. Thus, equation (2) is a function of the amount of magnetic flux and torque. Since, in fact, Ld and Lq are nonlinear, the current reference computation unit 11 determines Id and Iq based on table data corresponding to the torque and the magnetic flux. Here, the current reference computation unit 11 determines Id and Iq such that a predetermined amount of torque is obtained with the minimum current value $((Id^2 + Iq^2)^{(1/2)})$.

Based on the torque command Tm* output from the rotational speed controller 14 and the magnetic flux command Φ* output from the magnetic flux command computation unit 31, the magnetization current command computation unit 33 computes the required magnetization current to generate magnetization current commands IdM and IqM. In general, the magnetization current depends on the past magnetization history of the variable magnet up to the present. Hence, the magnetization current command computation unit 33 computes, for example, the required magnetization current by using table information on the past magnetization history and the magnetization current for the requested magnetic flux. Based on the magnetic flux command Φ* of this time and the magnetization characteristics of the variable magnet, the magnetization current command computation unit 33 computes a magnetization current target value IdM* and outputs it to the magnetization mode management unit 22. Since the magnetization current needs to be fast and accurately supplied, a hysteresis comparator or the like may be used instead of the PI control.

The voltage command computation unit 10 computes DQ axes voltage commands Vd* and Vq* such that the D-axis current reference IdR and the Q-axis current reference IqR computed by the current reference computation unit 11 agree with the D-axis current Id and the Q-axis current Iq, respectively. In this case, the voltage command computation unit 10 performs the PI control on current deviation to determine the DQ axes voltage commands.

Here, when the magnetization is performed, the inverter 4, which is the magnetization unit, needs to accurately supply, to the variable magnetic flux motor 1, an excessive amount of magnetization current in a short time. With the above-described PI control of the voltage command computation unit 10, since sufficient responsiveness is not secured, it may be difficult to accurately supply the magnetization current in a short time. To overcome this problem, the voltage command computation unit 10 can also compute, based on, for example, the magnetization current computed by the magnetization current command computation unit 33, the DQ axes voltage command by utilizing an instant comparison control mode such as a hysteresis comparator mode such that the D-axis current reference IdR and the Q-axis current reference IqR agree with the D-axis current Id and the Q-axis current Iq, respectively.

When the magnetization mode flag of the magnetization mode management unit 22 is set, the voltage command computation unit 10 generates the DQ axes voltage commands Vd* and Vq* such that a D-axis magnetization current command IdM and a Q-axis magnetization current command IqM agree with the D-axis current Id and the Q-axis current Iq, respectively.

The coordinate converter 5 performs coordinate conversion from the D-axis voltage command Vd* and the Q-axis voltage command Vq* output by the voltage command computation unit 10 to three-phase voltage commands Vu*, Vv* and Vw*, and outputs them to the PWM circuit 6. The PWM circuit 6 controls the turning on and off of the switching element of the inverter 4 based on the gate command Gst output by the operation mode management unit 20 and the three-phase voltage commands Vu*, Vv* and Vw*.

When the magnetization mode management unit 22 magnetizes the variable magnet based on the operation mode, it outputs various flags so as to control the magnetization current with appropriate timing. The detailed operation of the magnetization mode management unit 22 will be described later.

The action of this embodiment configured as described above will now be discussed. The case where the magnetization is not required will first be described. In this case, a command that is input is the operation command Run*. The operation mode management unit 20 selects one operation mode from among a plurality of operation modes based on the input operation command Run*.

The rotational speed command computation unit 12 computes, based on the operation mode selected by the operation mode management unit 20, the target rotational speed of the variable magnetic flux motor 1, and outputs the rotational speed command corresponding to the computation result to the rotational speed controller 14.

The rotational speed controller 14 outputs, based on the rotational speed command output from the rotational speed command computation unit 12 and the rotor rotation frequency ωR output from the pseudo differentiator 8, the torque command Tm* by which the variable magnetic flux motor 1 outputs the desired torque.

The magnetic flux command computation unit 31 computes, based on the operation mode selected by the operation mode management unit 20, the target magnetic flux value of the variable magnet, and generates the magnetic flux command Φ* corresponding to the target magnetic flux value.

Based on the torque command Tm* output from the rotational speed controller 14 and the magnetic flux command Φ* output from the magnetic flux command computation unit 31, the current reference computation unit 11 computes the D-axis current reference IdR and the Q-axis current reference IqR.

The voltage command computation unit 10 generates the DQ axes voltage commands Vd* and Vq* such that the D-axis current reference IdR and the Q-axis current reference IqR computed by the current reference computation unit 11 agree with the D-axis current Id and the Q-axis current Iq, respectively.

Since the magnetization is not necessary here, the magnetization mode flag of the magnetization mode management unit 22 is low (L). Thus, the voltage command computation unit 10 generates the DQ axes voltage commands Vd* and Vq* based on the DQ axes current reference output from the current reference computation unit 11, instead of the magnetization current command of the magnetization current command computation unit 33.

The coordinate converter 5 performs coordinate conversion from the D-axis voltage command Vd* and the Q-axis voltage command Vq* output from the voltage command computation unit 10 to the three-phase voltage commands Vu*, Vv* and Vw*, and outputs them to the PWM circuit 6. The PWM circuit 6 controls the turning on and off of the switching element of the inverter 4 based on the gate command Gst output from the operation mode management unit 20 and the three-phase voltage commands Vu*, Vv* and Vw*.

Figure 12:
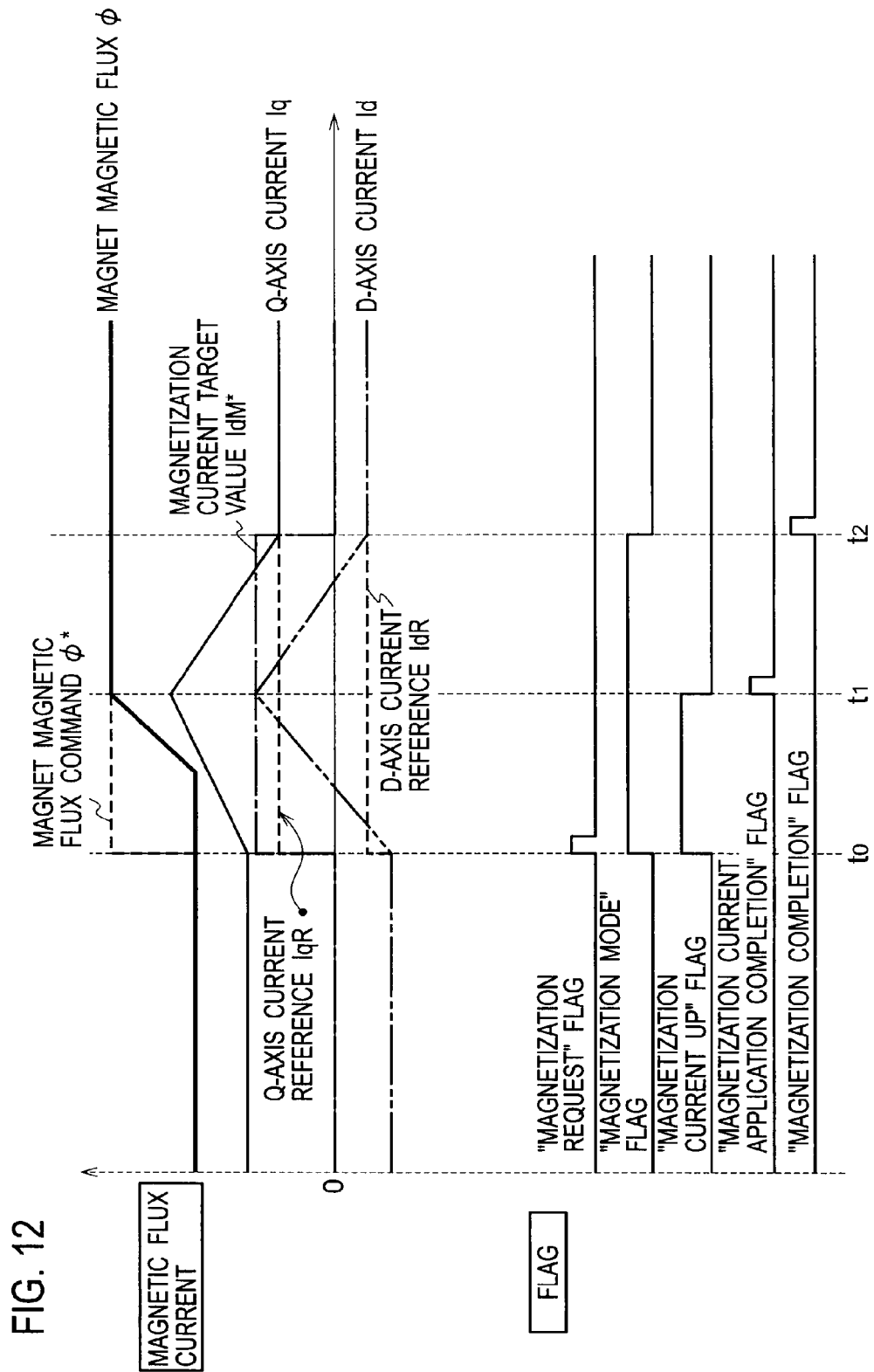
FIG. 12 is a time chart showing the states of the individual units of the variable magnetic flux motor drive system when the magnetization is performed in the second embodiment.

The case where the magnetization is required will now be described. FIG. 12 is a time chart showing the states of individual units of the variable magnetic flux motor drive system when the magnetization is performed. The same operation as in the above case where the magnetization is not required is performed until time to.

At time t0, the operation mode management unit 20 determines that the magnetization is necessary because of the change of the operation mode or the like, and sets the magnetization request flag. Specifically, the operation mode management unit 20 outputs the high (H) magnetization request flag to the magnetization mode management unit 22. Here, the operation mode management unit 20 may output the high (H) magnetization request flag only for a moment, and then turn back the magnetization request flag to the low (L) state and output it.

The magnetization mode management unit 22, when the magnetization request flag is input, sets the magnetization mode flag, and outputs the high (H) magnetization mode flag to the voltage command computation unit 10. The magnetization mode flag is kept high (H) until time t2 when the magnetization is completed.

The rotational speed command computation unit 12 and the rotational speed controller 14 perform the same operation as that when the magnetization is not required, and thus the description thereof will not be repeated.

When the magnetization request flag is input, the magnetization mode management unit 22 sets a magnetization current up flag and outputs the high (H) magnetization current up flag to the magnetization current command computation unit 33.

The magnetic flux command computation unit 31 computes, based on the operation mode selected by the operation mode management unit 20, the target magnetic flux value of the variable magnet, and generates the magnetic flux command Φ* corresponding to the target magnetic flux value. Here, since the operation mode is selected that requires the magnetization, the magnetic flux command computation unit 31 increases the value of the magnetic flux command Φ* at time to.

The magnetization current command computation unit 33 computes the required magnetization current based on the torque command Tm* output from the rotational speed controller 14 and the magnetic flux command Φ* output from the magnetic flux command computation unit 31, and generates the magnetization current commands IdM and IqM. The magnetization current command computation unit 33 also computes, based on the magnetic flux command Φ* of this time and the magnetization characteristics of the variable magnet, the magnetization current target value IdM*, and outputs it to the magnetization mode management unit 22.

Here, the magnetization current command computation unit 33, since the high (H) magnetization current up flag is input, gradually increases the magnetization current, that is, the D-axis magnetization current command IdM, from the D-axis current Id of the time to the magnetization current target value IdM* during a period from time t0 to t1. During the period between time t0 and time t1, the magnetic flux Φ of the magnet is increased by the magnetization based on the increase in the D-axis current.

During the magnetization (while the magnetization mode flag is set), the magnetization current (D-axis current) larger in amount than the normal value is supplied, and thus the torque varies. In order to reduce the variations in the torque, it is necessary to vary the Q-axis current according to the D-axis current. As described above, the torque equation for the motor that produces a reluctance torque is expressed as equation (2). The amount of magnetic flux Φ is estimated from the D-axis current at that time and previously found magnetization characteristics. Hence, based on the estimated amount of magnetic flux Φ, the D-axis current command and D-axis inductance Ld and Q-axis inductance Lq that are motor constants, the magnetization current command computation unit 33 computes the magnetization current command IqM with which the output torque agrees with the torque command Tm* without variations in the torque.

For example, when the magnetization is increased with a negative salient-pole machine as in the period from time t0 to time t1, the magnetization current command computation unit 33 generates the magnetization current command IqM so as to increase the Q-axis current.

Since the magnetization mode flag of the magnetization mode management unit 22 is set, the voltage command computation unit 10 generates the DQ axes voltage commands Vd* and Vq* such that the D-axis magnetization current command IdM and the Q-axis magnetization current command IqM that are generated by the magnetization current command computation unit 33 agree with the D-axis current Id and the Q-axis current Iq, respectively.

At time t0, the current reference computation unit 11 computes, based on the torque command Tm* output from the rotational speed controller 14 and the magnetic flux command Φ* output from the magnetic flux command computation unit 31, the D-axis current reference IdR and the Q-axis current reference IqR. The D-axis current Id and the Q-axis current Iq are controlled so as to agree with the D-axis current reference IdR and the Q-axis current reference IqR respectively, when the magnetization is completed (at time t2).

Then, the magnetization mode management unit 22 monitors the D-axis current Id output from the coordinate converter 7 and the magnetization current target value IdM* output from the magnetization current command computation unit 33, and sets the magnetization current up flag low (L) and the magnetization current completion flag high (H) when the D-axis current Id reaches the magnetization current target value IdM* (time t1).

Here, since the high (H) magnetization current application completion flag is input, the magnetization current command computation unit 33 gradually decreases the magnetization current, that is, the D-axis magnetization current command IdM, from the D-axis current Id at the time (t1) to the D-axis current reference IdR, which is the target during normal operation. In the meantime, the magnetization current command computation unit 33 properly controls the Q-axis current so as not to generate a transient torque.

Then, the magnetization mode management unit 22 monitors the D-axis current Id output from the coordinate converter 7 and the D-axis current reference IdR output from the current reference computation unit 11, and sets the magnetization mode flag low (L) and the magnetization completion flag high (H) when the D-axis current Id reaches the D-axis current reference IdR (time t2).

In the variable magnetic flux motor drive system of this embodiment, the above-described operation is performed to complete the magnetization, and the normal control is performed after time t2. In the normal control, as in the case where the above-described magnetization is not required, the voltage command computation unit 10 generates the DQ axes voltage commands Vd* and Vq* such that the D-axis current reference IdR and the Q-axis current reference IqR computed by the current reference computation unit 11 agree with the D-axis current Id and the Q-axis current Iq, respectively.

In the variable magnetic flux motor drive system of this embodiment, since the magnetic flux Φ of the magnet is increased after time t1, as compared with the period before time t0, after time t2, the D-axis current is increased, and thus the Q-axis current is decreased to keep the torque constant.

The other actions are the same as in the case where the above-described magnetization is not required, and the description thereof will not be repeated.

As described above, in the variable magnetic flux motor drive system of this embodiment, even when it is applied to a device having a plurality of operation modes where the torque and the rotational speed are different, the operation mode management unit 20 selects the operation mode according to the situation, and the magnetic flux command computation unit 31 computes the target magnetic flux value of the variable magnet based on the operation mode. Thus, it is possible to select the magnetic flux value most suitable for each operation mode and to achieve high efficiency of the system and reduce the noise.

In particular, the magnetic flux command computation unit 31 has any of the efficiency improvement information, the safety improvement information and the noise improvement information for the variable magnetic flux motor drive system, and computes the target magnetic flux value of the variable magnet according to the operation mode selected by the operation mode management unit 20 and based on the above information. That is, with the variable magnetic flux motor drive system of this embodiment, it is possible to determine the optimum magnetic flux value according to the operation mode. Here, the word "optimum" has various indications, and, for example, it indicates the efficiency of the system, or it indicates that a high priority is given to the efficiency in one mode and that a high priority is given to the reduction of the noise in the other mode. Thus, with this system, it is possible to enhance the "optimization" suitable for a device to which this system is applied.

Figure 13:
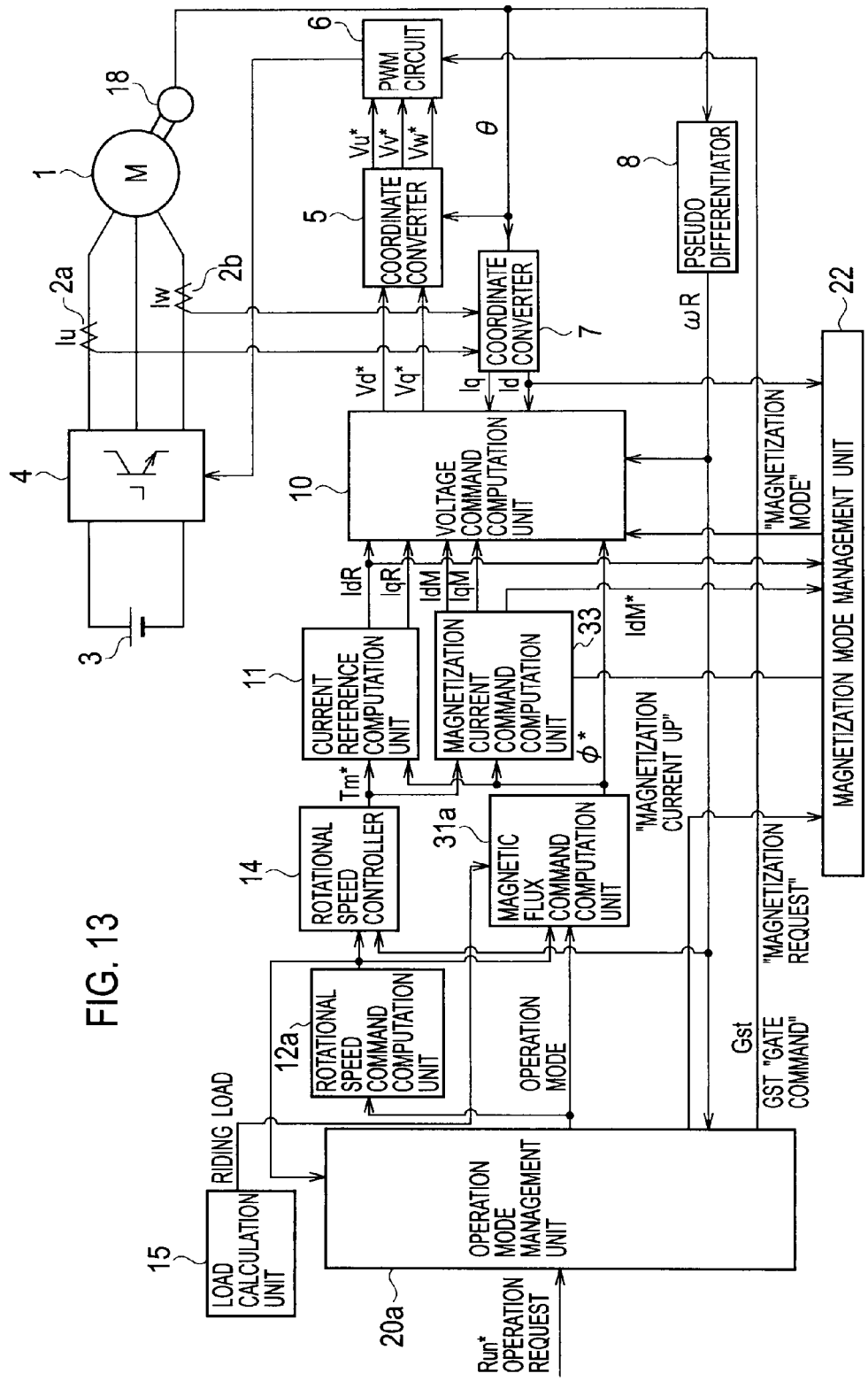
FIG. 13 is a block diagram showing the configuration of a third embodiment of the variable magnetic flux motor drive system of the present invention.

A third embodiment will now be described. FIG. 13 is a block diagram showing the configuration of the variable magnetic flux motor drive system of this embodiment. The third embodiment differs from the second embodiment described above in that a load calculation unit 15 is provided. The variable magnetic flux motor drive system of this embodiment is applied to an elevator.

The load calculation unit 15 calculates the cage live load (riding load) of an elevator, and outputs it to a magnetic flux command computation unit 31*a*.

An operation mode management unit 20*a* has an operation mode for accelerating the elevator (acceleration mode), an operation mode for decelerating the elevator (deceleration mode), an operation mode for operating the elevator at a constant speed (constant speed mode) and an operation mode for stopping the elevator (stop mode).

In other words, it can be said that at least one of a plurality of operation modes which the operation mode management unit 20a has is an operation mode based on at least one of the torque and the rotational speed of the variable magnetic flux motor 1. It also can be said that, since the operation mode management unit 20a has the stop mode, at least one of plural operation modes that the operation mode management unit 20a has is an operation mode based on the operation or the stop of the inverter 4.

A magnetic flux command computation unit 31a computes, according to not only the operation mode but also the cage live load of the elevator, the target magnetic flux value of the variable magnet, and generates the magnetic flux command corresponding to the target magnetic flux value.

A rotational speed command computation unit 12a computes the target rotational speed of the variable magnetic flux motor 1 based on the operation mode selected by the operation mode management unit 20a, and outputs a rotational speed command corresponding to the computation result to the rotational speed controller 14, the operation mode management unit 20a and the magnetic flux command computation unit 31a. The other configuration is the same as the second embodiment, and thus the description thereof will not be repeated.

Figure 14:
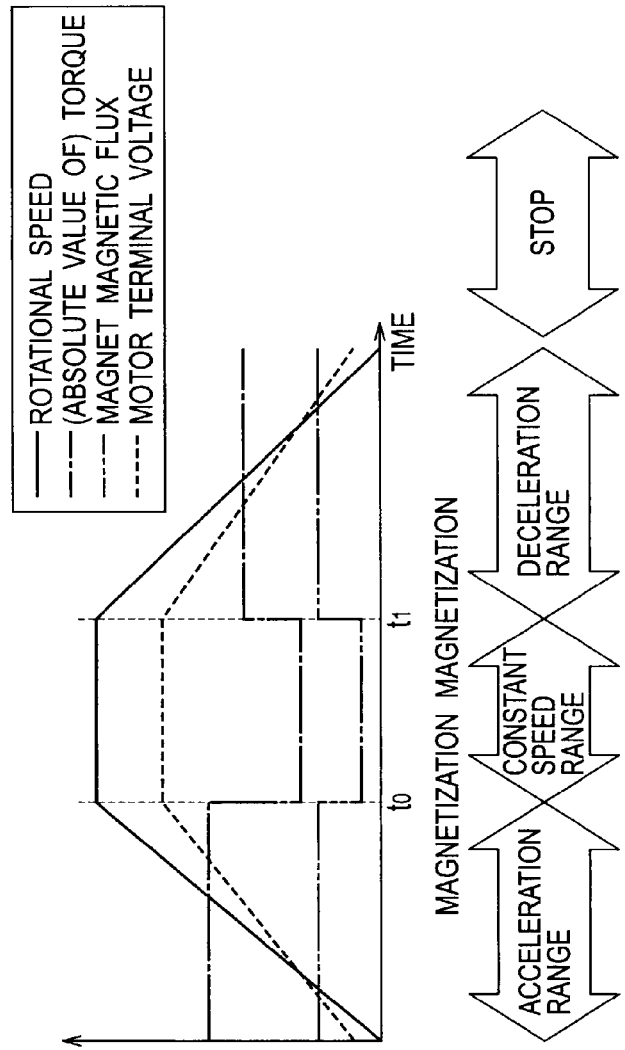
FIG. 14 is a time chart showing the controlled state of an elevator to which the variable magnetic flux motor drive system of the third embodiment is applied.

The action of this embodiment configured as described above will now be discussed. FIG. 14 is a time chart showing the controlled state of the elevator to which the variable magnetic flux motor drive system of this embodiment is applied.

First, in order for the elevator at rest to be moved to another floor, the operation command Run* is input to the operation mode management unit 20a. Based on the input operation command Run*, the operation mode management unit 20a selects the acceleration mode from among a plurality of operation modes. The operation mode management unit 20a outputs the high (H) gate command Gst to the PWM circuit 6 to start the operation of the inverter 4.

The rotational speed command computation unit 12a computes the target rotational speed of the variable magnetic flux motor 1 based on the acceleration mode selected by the operation mode management unit 20a, and outputs the rotational speed command corresponding to the computation result to the rotational speed controller 14, the operation mode management unit 20a and the magnetic flux command computation unit 31a.

Based on the rotational speed command output from the rotational speed command computation unit 12a and the rotor rotation frequency ωR output from the pseudo differentiator 8, the rotational speed controller 14 outputs the torque command Tm* which is generated such that the variable magnetic flux motor 1 has the desired torque. As shown in FIG. 14, the variable magnetic flux motor 1 is controlled such that, in an acceleration range, the rotational speed is gradually increased to the target rotational speed at the desired torque.

The magnetic flux command computation unit 31a computes the target magnetic flux value of the variable magnet based on the operation mode selected by the operation mode management unit 20a, the rotational speed command output from the rotational speed command computation unit 12a and the riding load calculated by the load calculation unit 15, and generates the magnetic flux command Φ* corresponding to the target magnetic flux value.

Specifically, the magnetic flux command computation unit 31a utilizes the input riding load to determine the required torque. That is because, when the required torque is large, the magnetic flux command computation unit 31a needs to output, as the magnetic flux command, a large magnetic flux value corresponding to the required torque. When the required torque is determined, the magnetic flux command computation unit 31a computes a mass in a movement system and an external force acting on the movement system based on the riding load. In general, the elevator is designed such that a force is unnecessary by a counterweight at a predetermined riding load, and an external force is necessary when the riding load fluctuates. Hence, the magnetic flux command computation unit 31a computes, based on the riding load, the mass in the movement system and the external force acting on the movement system, and determines the required torque, and outputs the optimum magnetic flux command based on the operation mode and the required torque (and furthermore the rotational speed command if needed).

Here, the "optimum" magnetic flux command (the amount of magnetic flux) can refer to various cases, and, for example, those cases include a case where a loss caused by the operation is minimized and the amount of magnetic flux is obtained such that the maximum efficiency including the motor inverter is achieved, and the case where the amount of magnetic flux is obtained such that sound is low.

The magnetic flux command computation unit 31a may use a function or refer to a table as the method of determining the magnetic flux command based on the operation mode and the riding load. The magnetic flux command computation unit 31a may determine the magnetic flux command based on the operation mode, the riding load and the rotational speed because the rotational speed at the constant mode, which will be described later, may vary depending on the target floor. As described above, since the riding load is one of the elements that determine the torque, the magnetic flux command computation unit 31a may determine the magnetic flux command based on the operation mode, the required torque and the rotational speed.

Basically, unless the operation mode is changed, the magnetic flux command computation unit 31a performs control such that the magnetic flux value of the variable magnet is kept constant. Hence, the magnetic flux command computation unit 31a performs the magnetization (the magnetic flux value of the variable magnet is changed) only when the operation mode is changed, and outputs, after the completion of the change of the operation mode, the magnetic flux command Φ* such that the magnetic flux value set at the time of the immediately preceding mode change is maintained. The above is the same as in the following embodiments.

The other actions in the acceleration mode are the same as in the case where the magnetization is not required in the second embodiment, and thus the description thereof will not be repeated.

The operation mode management unit 20a monitors the rotational speed command output from the rotational speed command computation unit 12a and the rotor rotation frequency ωR output from the pseudo differentiator 8, and selects and outputs the constant speed mode when the predetermined rotational speed is reached (time t0).

At time t0, the operation mode management unit 20a determines that the magnetization is required, and sets the magnetization request flag. Specifically, the operation mode management unit 20a outputs the high (H) magnetization request flag to the magnetization mode management unit 22.

The other actions at time t0 when the magnetization is performed are the same as in the case where the magnetization is required in the second embodiment, and thus the description thereof will not be repeated. At time t0, since the operation mode is changed from the acceleration mode to the constant speed mode, a high torque is not required, and a low torque may be used. In particular, when the cage of the elevator is balanced with the counter weight, the torque value in the constant speed mode is substantially zero. Since a low torque may be used, there is flexibility in the amount of the magnetic flux of the magnet, and thus it is possible to reduce the magnetic flux value and hence an iron loss.

Therefore, at time t0 when the magnetization is performed in this embodiment, since the magnetization current is controlled to be reduced, the magnetization mode management unit 22 sets, when the magnetization request flag is input, not the magnetization current up flag but the magnetization current down flag. Since the high (H) magnetization current down flag is input, the magnetization current command computation unit 33 gradually decreases the magnetization current, that is, the D-axis magnetization current command IdM from the value of the D-axis current Id at the time (t0) to the magnetization current target value IdM*.

In the variable magnetic flux motor drive system of this embodiment, the magnetization is instantaneously completed at time t0, and thus the magnetic flux of the magnet is decreased, but, in fact, such an operation is the same operation as in the case where the magnetization is required in the second embodiment.

During the period between time t0 and time t1, the operation mode management unit 20a selects and outputs the constant speed mode. Consequently, in order to maintain the rotational speed of the variable magnetic flux motor 1 which is set at the target in the acceleration mode, the rotational speed command computation unit 12a outputs the corresponding rotational speed command to the rotational speed controller 14, the operation mode management unit 20a and the magnetic flux command computation unit 31a.

Based on the rotational speed command output from the rotational speed command computation unit 12a and the rotor rotation frequency ωR output from the pseudo differentiator 8, the rotational speed controller 14 outputs the torque command Tm* by which the variable magnetic flux motor 1 maintains a predetermined low torque (or substantially zero). As shown in FIG. 14, in a constant speed range, the variable magnetic flux motor 1 is controlled such that the predetermined low torque and the predetermined rotational speed are maintained.

The magnetic flux command computation unit 31a computes the target magnetic flux value of the variable magnet based on the operation mode (constant speed mode) selected by the operation mode management unit 20a, the rotational speed command output from the rotational speed command computation unit 12a and the riding load calculated by the load calculation unit 15, and generates the magnetic flux command Φ* corresponding to the target magnetic flux value.

Specifically, the magnetic flux command computation unit 31a generates the magnetic flux command Φ* so as to maintain the magnetic flux value reduced at time t0 when the magnetization is performed.

The operation mode management unit 20a selects and outputs the deceleration mode when the cage of the elevator is moved a predetermined distance or when a predetermined period elapses in the constant speed mode (time t1).

At time t1, the operation mode management unit 20a determines that the magnetization is required, and sets the magnetization request flag. Specifically, the operation mode management unit 20a outputs the high (H) magnetization request flag to the magnetization mode management unit 22.

The other actions at time t1 when the magnetization is performed are the same as in the case where the magnetization is performed at time t0, and thus the description thereof will not be repeated. At time t1, however, since the operation mode is changed from the constant speed mode to the deceleration mode, a predetermined torque is required to decelerate the speed. Although the torque required to decelerate the speed is opposite in the direction of force to the torque required to accelerate the speed, the torque shown in FIG. 14 is an absolute value, and thus it indicates a positive value at the time of both the acceleration and the deceleration.

When the acceleration in the acceleration mode is equal to the deceleration in the deceleration mode, the absolute value of the torque is equal in both modes. However, as shown in FIG. 14, in this embodiment, the absolute value of the torque is larger in the acceleration range than that in the deceleration range. For example, in a case where the riding load of the cage of the elevator is heavier than the counter weight, when the elevator is raised, the torque of the variable magnetic flux motor 1 is observed as shown in FIG. 14.

Since a predetermined torque is necessary for the deceleration, the magnetic flux value is increased at time t1 when the magnetization is performed.

After the time t1, the operation mode management unit 20a selects and outputs the deceleration mode. Thus, the rotational speed command computation unit 12a sets the target rotational speed of the variable magnetic flux motor 1 at zero, and outputs the rotational speed command to the rotational speed controller 14, the operation mode management unit 20a and the magnetic flux command computation unit 31a.

Based on the rotational speed command (the target rotational speed of zero) output from the rotational speed command computation unit 12a and the rotor rotation frequency ωR output from the pseudo differentiator 8, the rotational speed controller 14 outputs the torque command Tm* for maintaining the torque required to decelerate the speed of the variable magnetic flux motor 1. As shown in FIG. 14, in the deceleration range, the variable magnetic flux motor 1 maintains the predetermined torque, and gradually decreases the rotational speed.

The magnetic flux command computation unit 31a computes the target magnetic flux value of the variable magnet based on the operation mode (deceleration mode) selected by the operation mode management unit 20a, the rotational speed command output from the rotational speed command computation unit 12a and the riding load calculated by the load calculation unit 15, and generates the magnetic flux command Φ* corresponding to the target magnetic flux value.

Thereafter, the operation mode management unit 20a selects and outputs the stop mode based on the rotor rotation frequency ωR output from the pseudo differentiator 8 when the rotational speed becomes zero. The individual units of the variable magnetic flux motor drive system stop after performing processing necessary for the stop.

The other actions are the same as in the second embodiment, and the description thereof will not be repeated.

As described above, with the variable magnetic flux motor drive system of this embodiment, in addition to the effects of the second embodiment, it is possible to control the magnetic flux value of the variable magnet to an appropriate value in four modes of the elevator, namely, the acceleration mode, the deceleration mode, the constant speed mode and the stop mode. Since the operation mode management unit 20a has the operation mode based on the torque of and the rotational speed of the variable magnetic flux motor 1 or based on the operation state or the stop state of the inverter 4, the magnetic flux command computation unit 31a determines the magnetic flux value most suitable for each operation mode, and thereby can achieve the effectiveness of the system.

Specifically, in a mode, such as the constant speed mode or the stop mode, where a torque is not so required, the magnetic flux command computation unit 31a can reduce the magnetic flux value of the variable magnet and hence the iron loss. In the acceleration mode or the deceleration mode, when the magnetic flux value is flexible in consideration of the required torque based on the cage riding load of the elevator, the magnetic flux command computation unit 31a sets the magnetic flux value at an appropriate magnetic flux value, and thus it is possible to reduce a loss to achieve the effectiveness of the system.

Figure 15:
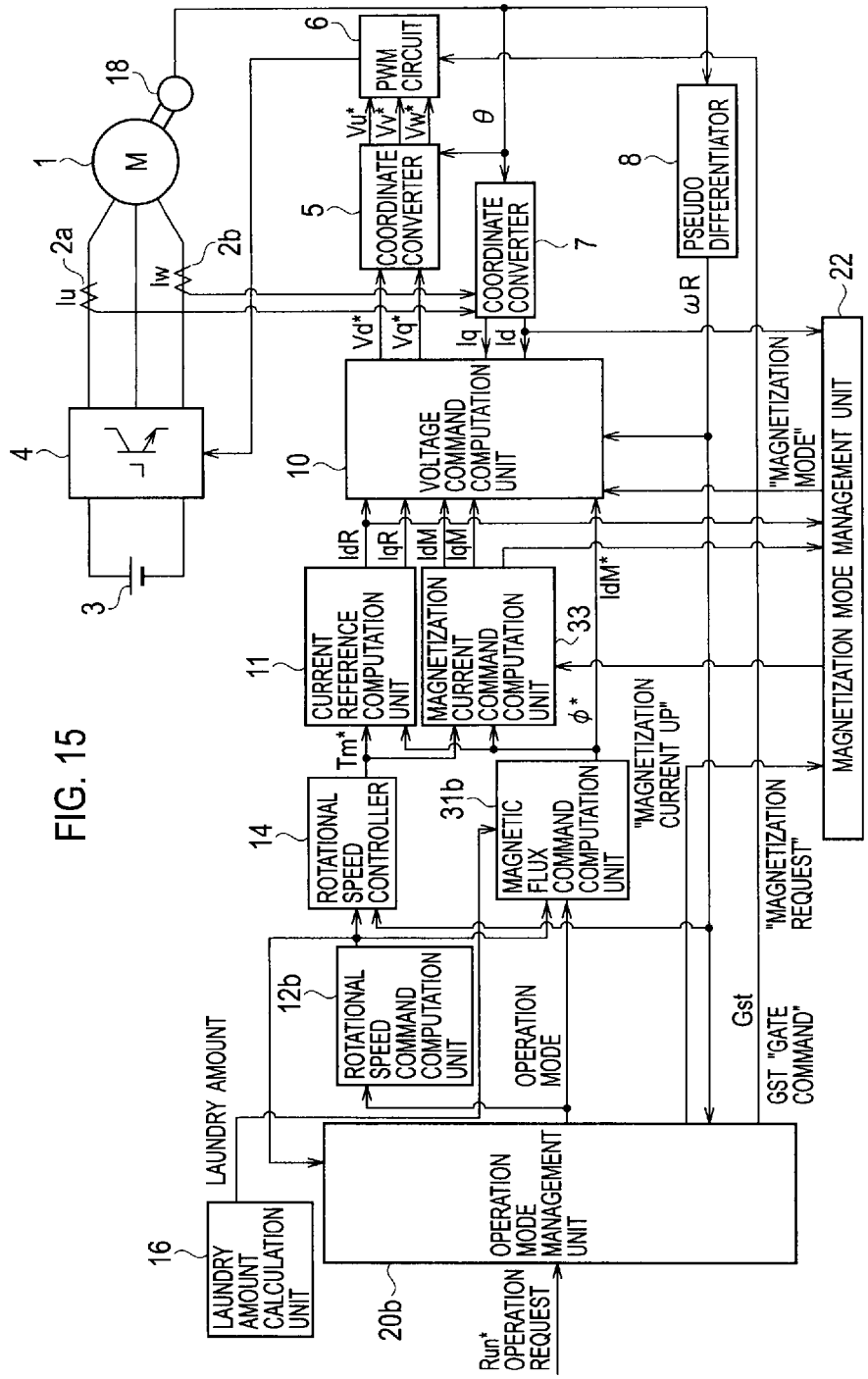
FIG. 15 is a block diagram showing the configuration of a fourth embodiment of the variable magnetic flux motor drive system of the present invention.

A fourth embodiment will now be described. FIG. 15 is a block diagram showing the configuration of the variable magnetic flux motor drive system of this embodiment. The fourth embodiment differs from the third embodiment described above in that, instead of the load calculation unit 15, a laundry amount calculation unit 16 is provided. The variable magnetic flux motor drive system of this embodiment is applied to a washing machine.

The laundry amount calculation unit 16 calculates the amount (weight) of laundry within the washing machine, and outputs it to a magnetic flux command computation unit 31b.

An operation mode management unit 20b has an operation mode for washing laundry with the washing machine (washing mode), an operation mode for performing rinsing (rinsing mode), an operation mode for performing spinning (spinning mode) and an operation mode for performing drying (drying mode).

In addition to the operation mode, the magnetic flux command computation unit 31b computes the target magnetic flux value of the variable magnet according to the amount (weight) of laundry contained in the washing machine, and generates the magnetic flux command corresponding to the target magnetic flux value.

A rotational speed command computation unit 12b computes the target rotational speed of the variable magnetic flux motor 1 based on the operation mode selected by the operation mode management unit 20b, and outputs the rotational speed command corresponding to the computation result to the rotational speed controller 14, the operation mode management unit 20b and the magnetic flux command computation unit 31b.

The other configuration is the same as in the third embodiment, and the description thereof will not be repeated.

Figure 16:
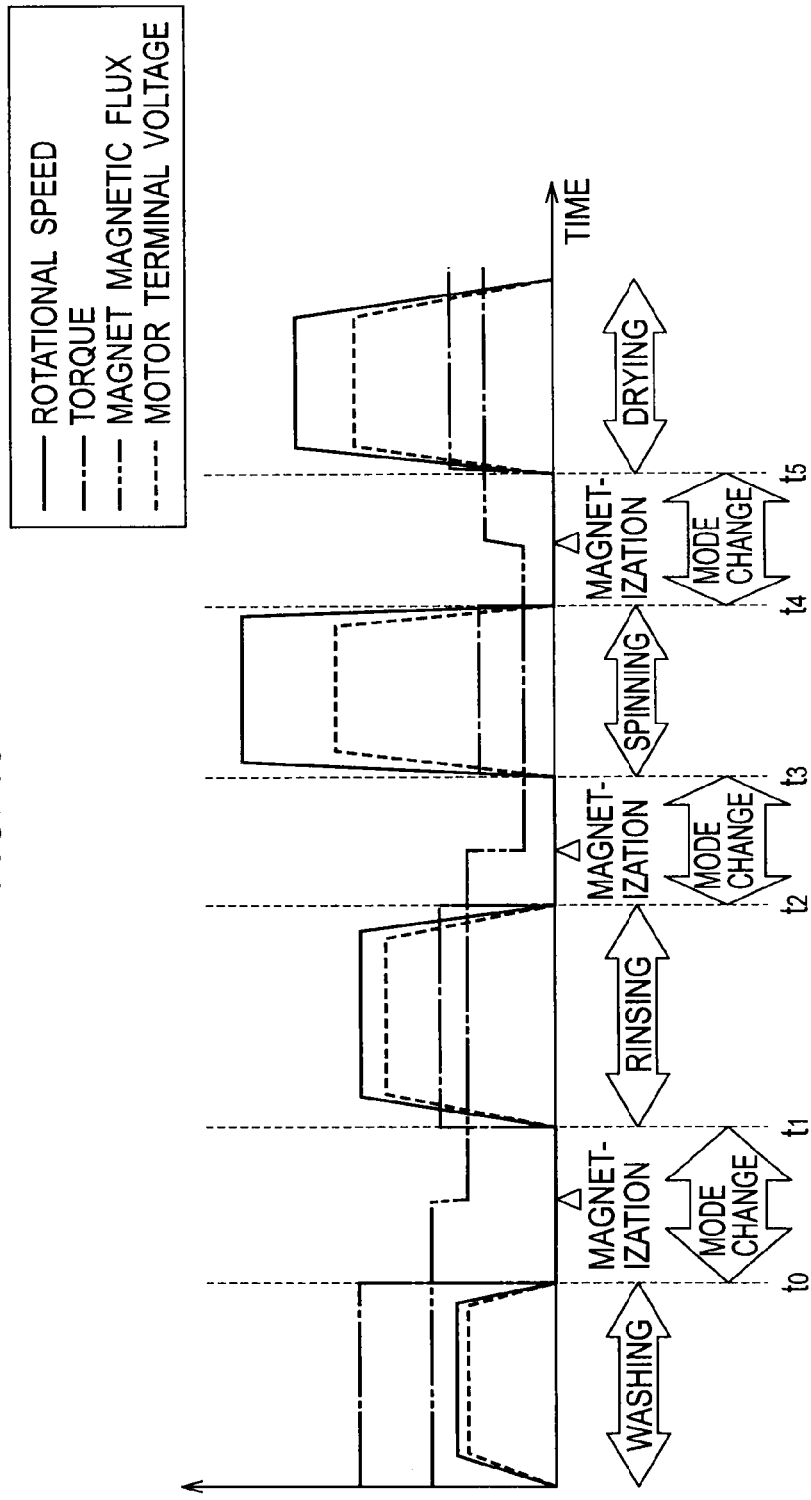
FIG. 16 is a time chart showing the controlled state of a washing machine to which the variable magnetic flux motor drive system of the fourth embodiment is applied.

The action of this embodiment configured as described above will now be discussed. FIG. 16 is a time chart showing the controlled state of the washing machine to which the variable magnetic flux motor drive system of this embodiment is applied.

First, in order for the laundry contained in the washing machine to be washed, the operation command Run* is input to the operation mode management unit 20b. Based on the input operation command Run*, the operation mode management unit 20b selects the washing mode from among a plurality of operation modes. The operation mode management unit 20b also outputs the high (H) gate command Gst to the PWM circuit 6 to start the operation of the inverter 4.

The rotational speed command computation unit 12b computes, based on the washing mode selected by the operation mode management unit 20b, the target rotational speed of the variable magnetic flux motor 1, and outputs the rotational speed command corresponding to the computation result to the rotational speed controller 14, the operation mode management unit 20b and the magnetic flux command computation unit 31b.

Based on the rotational speed command output from the rotational speed command computation unit 12a and the rotor rotation frequency ωR output from the pseudo differentiator 8, the rotational speed controller 14 outputs the torque command Tm* which is generated such that the variable magnetic flux motor 1 has the desired torque.

The magnetic flux command computation unit 31b computes the target magnetic flux value of the variable magnet based on the operation mode selected by the operation mode management unit 20b, the rotational speed command output from the rotational speed command computation unit 12b and the amount of laundry calculated by the laundry amount calculation unit 16, and generates the magnetic flux command Φ* corresponding to the target magnetic flux value.

Specifically, the magnetic flux command computation unit 31b uses the amount of laundry to determine the required torque, and determines the optimum magnetic flux value based on the operation mode and the amount of laundry (and furthermore the rotational speed if needed).

Here, the "optimum" magnetic flux value (the amount of magnetic flux) can refer to various cases, and, for example, those cases include a case where a loss caused by the operation is minimized and the amount of magnetic flux is obtained such that the maximum efficiency including the motor inverter is achieved, and the case where the amount of magnetic flux is obtained such that sound is low.

As in the third embodiment, since the amount of laundry is one of the elements that determine the torque, the magnetic flux command computation unit 31b may determine the magnetic flux command based on the operation mode, the required torque and the rotational speed. The magnetic flux command computation unit 31b may use a function or refer to a table as the method of determining the magnetic flux command based on the operation mode, the amount of laundry (or the required torque) and the rotational speed.

The other actions in the washing mode are the same as in the third embodiment (for example, the constant speed mode), and thus the description thereof will not be repeated.

The operation mode management unit 20b selects and outputs the rinsing mode at the time (time t0) when a predetermined period elapses. During the period between time t0 and time t1, mode change is performed from the washing mode to the rinsing mode. The operation mode management unit 20b may have a change mode for performing the mode change as one of the operation modes.

During the period between time t0 and time t1, the operation mode management unit 20b determines that the magnetization is required, and sets the magnetization request flag. Specifically, the operation mode management unit 20b outputs the high (H) magnetization request flag to the magnetization mode management unit 22.

When the magnetic flux of the variable magnet is changed by the inverter 4, which is the magnetization unit, the rotational speed command computation unit 12b sets the target rotational speed of the variable magnetic flux motor 1 less than the present rotational speed or stops the variable magnetic flux motor 1. When the magnetic flux of the variable magnet is changed by the inverter 4, which is the magnetization unit, the rotational speed controller 14 generates and outputs the torque command Tm* for setting the target torque of the variable magnetic flux motor 1 less than the present torque or approximately equal to zero. In other words, during the mode change, since the rotational speed and the torque are controlled to be reduced, the variable magnetic flux motor drive system performs the magnetization (increases or decreases the magnetic flux value of the variable magnet).

The other actions when the magnetization is performed during the mode change are the same as those when the magnetization is performed in the second and third embodiments, and thus the description thereof will not be repeated.

Thereafter, the operation mode management unit 20*b* sequentially shifts the operation modes from the rinsing mode to the spinning mode and to the drying mode in consideration of a predetermined period and the like. During the mode change, as during the above-described mode change from the washing mode to the rinsing mode, the variable magnetic flux motor drive system reduces the rotational speed and the torque, and performs the magnetization.

As shown in FIG. 16, the respective operation modes have different numbers of revolutions and different amounts of torque according to actions on the laundry in the respective modes. Hence, when the magnetization is performed during the mode change, the magnetic flux command computation unit 31*b* computes the magnetic flux value most suitable for the succeeding operation mode, based on the operation mode selected by the operation mode management unit 20*b*, the rotational speed command output from the rotational speed command computation unit 12*b* and the amount of laundry calculated by the laundry amount calculation unit 16, and generates the magnetic flux command Φ* corresponding to the magnetic flux value.

The other actions are the same as those in the third embodiment, and thus the description thereof will not be repeated.

As described above, with the variable magnetic flux motor drive system of this embodiment, in addition to the effects of the second and third embodiments, it is possible to control the magnetic flux value of the variable magnet to an appropriate value in the four modes, namely, the washing mode, the rinsing mode, the spinning mode and the drying mode.

Since an excessive amount of magnetization current is supplied at the time of the magnetization, the inverter 4, which is the magnetization unit, requires a voltage higher than the normal voltage. Hence, when the rotational speed is high, there is no allowance for the output voltage, and thus it is difficult for the inverter 4 to supply the magnetization current for performing the magnetization. In order for this problem to be solved, in the variable magnetic flux motor drive system of this embodiment, the rotational speed is lowered at the time of the mode change, and thus an allowance for the voltage is obtained, and thereafter the magnetization is performed. Thus, it is possible to achieve low cost without the need for increasing both the withstand voltage of the inverter 4 and the voltage input to the inverter 4.

Since the magnetization is performed when the torque is zero (or about zero), it is possible to reduce torque shock. In the variable magnetic flux motor drive system of this embodiment, since, during the mode change, the rotational speed becomes zero such that the torque becomes zero, it is possible to reduce the torque shock when the magnetization is performed.

The reduction of the torque shock makes it possible to reduce stress imposed on the device and components, to enhance life and reliability and to reduce noise.

Figure 17:
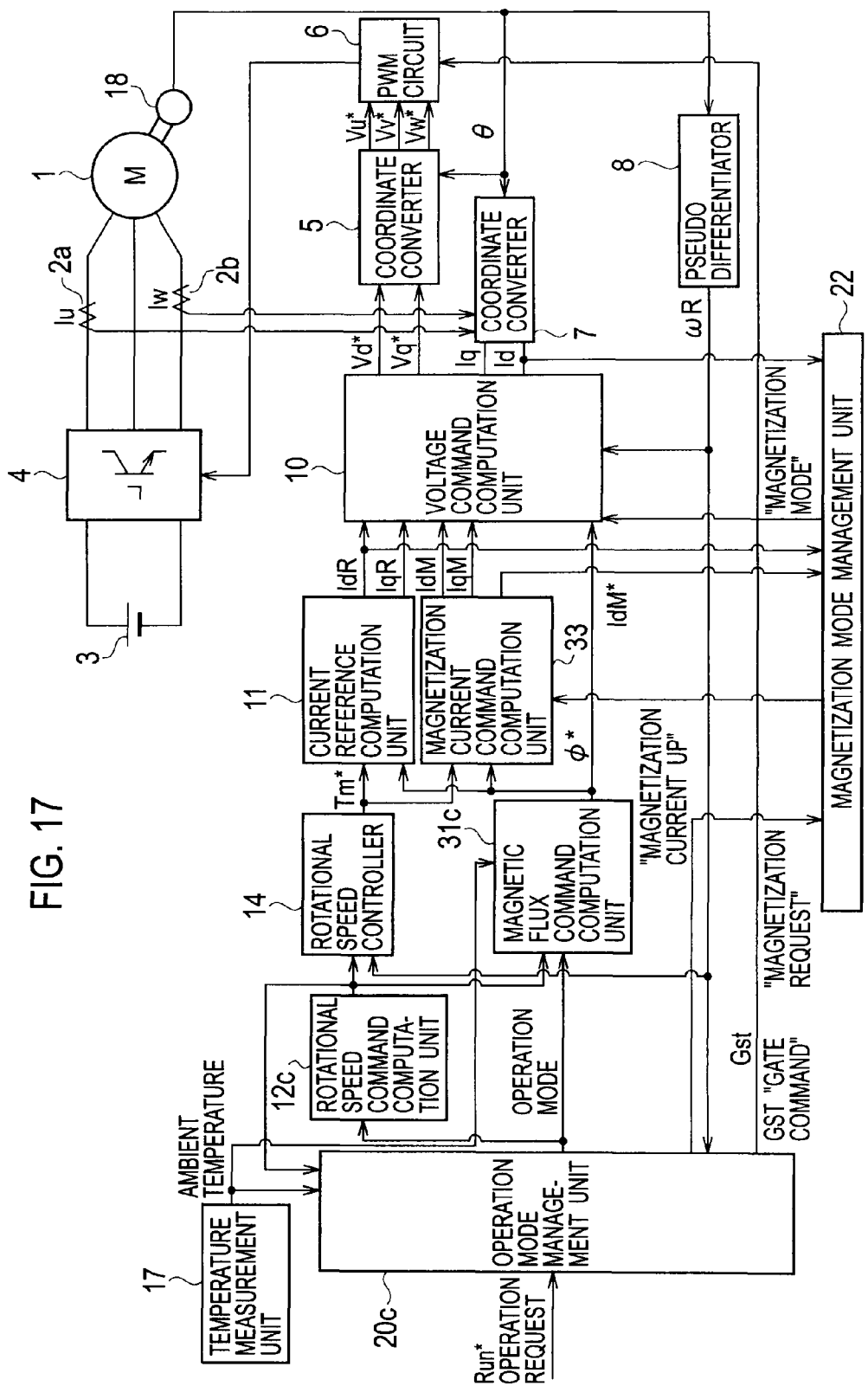
FIG. 17 is a block diagram showing the configuration of a fifth embodiment of the variable magnetic flux motor drive system of the present invention.

A fifth embodiment will now be described. FIG. 17 is a block diagram showing the configuration of the variable magnetic flux motor drive system of this embodiment. The fifth embodiment differs from the fourth embodiment in that, instead of the laundry amount calculation unit 16, a temperature measurement unit 17 is provided. The variable magnetic flux motor drive system of this embodiment is applied to an air conditioner.

The temperature measurement unit 17 measures the outdoor air temperature, and outputs it to a magnetic flux command computation unit 31*c*.

An operation mode management unit 20*c* has an operation mode (acceleration mode) for an acceleration operation in which the air conditioner performs rapid cooling and heating, an operation mode (steady mode) for a normal operation that is performed after the target temperature is reached and an operation mode (mode-change mode) for changing the operation mode. The operation mode management unit 20*c* may have a stop mode for stopping the inverter 4 and the variable magnetic flux motor 1 when the air conditioner is stopped.

The magnetic flux command computation unit 31*c* computes the target magnetic flux value of the variable magnet according to not only the operation mode but also the outdoor air temperature measured by the temperature measurement unit 17, and generates the magnetic flux command corresponding to the target magnetic flux value.

A rotational speed command computation unit 12*c* computes, based on the operation mode selected by the operation mode management unit 20*c*, the target rotational speed of the variable magnetic flux motor 1, and outputs the rotational speed command corresponding to the computation result to the rotational speed controller 14, the operation mode management unit 20*c* and the magnetic flux command computation unit 31*c*. The other configuration is the same as that of the fourth embodiment, and thus the description thereof will not be repeated.

Figure 18:
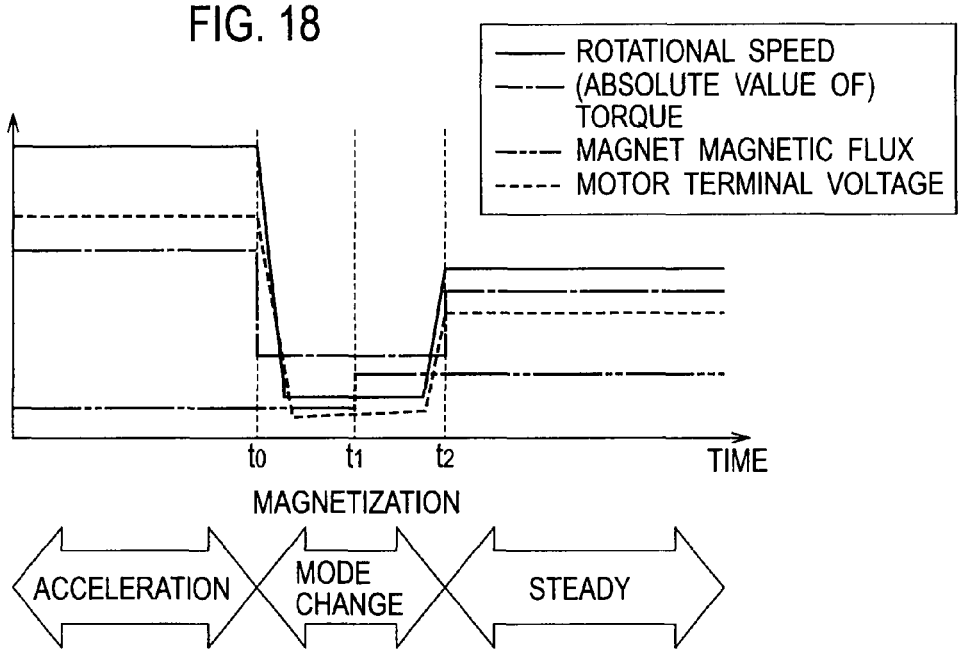
FIG. 18 is a time chart showing the controlled state of an air conditioner to which the variable magnetic flux motor drive system of the fifth embodiment is applied.

The actions of this embodiment configured as described above will now be described. FIG. 18 is a time chart showing the controlled state of the air conditioner to which the variable magnetic flux motor drive system of this embodiment is applied.

First, the operation command Run* is input to the operation mode management unit 20*c* so as to adjust the temperature to the set value. The operation mode management unit 20*c* selects the acceleration mode from among a plurality of operation modes based on the input operation command Run*. The operation mode management unit 20*c* also outputs the high (H) gate command Gst to the PWM circuit 6 to start the operation of the inverter 4.

The rotational speed command computation unit 12*c* computes, based on the acceleration mode selected by the operation mode management unit 20*c*, the target rotational speed of the variable magnetic flux motor 1, and outputs the rotational speed command corresponding to the computation result to the rotational speed controller 14, the operation mode management unit 20*c* and the magnetic flux command computation unit 31*c*.

The rotational speed controller 14 outputs, based on the rotation number command output from the rotational speed command computation unit 12*c* and the rotor rotation frequency ωR output from the pseudo differentiator 8, the torque command Tm* which is generated such that the variable magnetic flux motor 1 has the desired torque.

The magnetic flux command computation unit 31*c* computes the target magnetic flux value of the variable magnet based on the operation mode selected by the operation mode management unit 20*c*, the rotational speed command output from the rotational speed command computation unit 12*c* and the outdoor air temperature measured by the temperature measurement unit 17, and generates the magnetic flux command Φ* corresponding to the target magnetic flux value.

Specifically, the magnetic flux command computation unit 31*c* uses the outdoor air temperature and information on the set temperature to determine the required torque, and determines the optimum magnetic flux value based on the operation mode and outdoor air temperature (and furthermore the rotational speed if needed). For example, when there is a large difference between the set temperature in the operation mode (acceleration mode) output from the operation mode management unit 20*c* and the outdoor air temperature, a high torque and a large rotational speed are required, and thus the magnetic flux command computation unit 31c sets the magnetic flux value such that the optimum efficiency is acquired according to the situation.

As in the fourth embodiment, since the outdoor air temperature is one of the elements that determine the torque, the magnetic flux command computation unit 31c may determine the magnetic flux command based on the operation mode, the required torque and the rotational speed.

The other actions in the acceleration mode are the same as those in the fourth embodiment (for example, the washing mode), and thus the description thereof will not be repeated.

The operation mode management unit 20c compares the target temperature set by the operation command Run* with the actual temperature (for example, the outdoor air temperature measured by the temperature measurement unit 17), and selects and outputs the mode-change mode from among a plurality of operation modes when the actual temperature reaches the target temperature (time t0), and thereafter (time t2) selects and outputs the steady mode.

When the magnetic flux of the variable magnet is changed by the inverter 4, which is the magnetization unit, the rotational speed command computation unit 12c sets the target rotational speed of the variable magnetic flux motor 1 less than the present rotational speed or stops the variable magnetic flux motor 1. When the magnetic flux of the variable magnet is changed by the inverter 4, which is the magnetization unit, the rotational speed controller 14 generates and outputs the torque command Tm* for setting the target torque of the variable magnetic flux motor 1 less than the present torque or approximately equal to zero. In other words, during the mode change (from time t0 to time t2), since the rotational speed and the torque are controlled to be reduced, the variable magnetic flux motor drive system performs (increases or decreases the magnetic flux value of the variable magnet) the magnetization (time t1).

Figure 19:
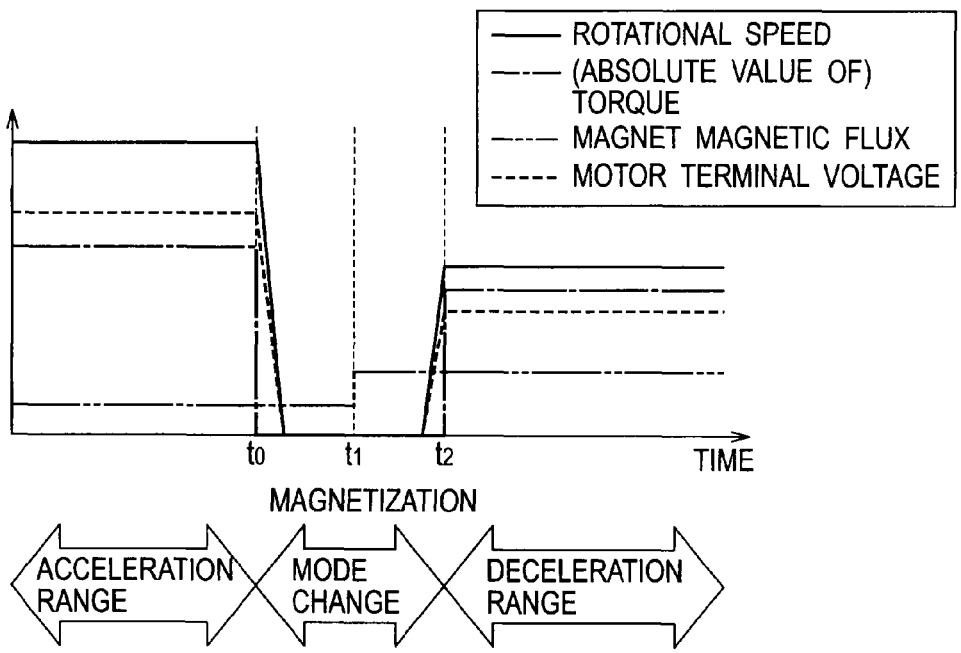
FIG. 19 is another time chart showing the controlled state of the air conditioner to which the variable magnetic flux motor drive system of the fifth embodiment is applied.

FIG. 19 is another time chart showing the controlled state of the air conditioner to which the variable magnetic flux motor drive system of this embodiment is applied. This case differs from the case of FIG. 18 in that the rotational speed and the torque of the variable magnetic flux motor 1 in the mode-change mode (from time t0 to time t2) are zero. As shown in FIG. 19, in the air conditioner, the instantaneous stop of the rotation at the mode-change locally causes the cooling and heating performance to be degraded, but improves the efficiency as a whole, and thus this method is effective. A time period necessary for the magnetization is almost one second or less, and this does not raise a problem in the practical use.

During the period between time t0 and time t2, the operation mode management unit 20c determines that the magnetization is required, and sets the magnetization request flag. Specifically, the operation mode management unit 20c outputs the high (H) magnetization request flag to the magnetization mode management unit 22.

The other actions when the magnetization is performed (time t1) during the mode change are the same as those when the magnetization is performed in the second to fourth embodiments, and thus the description thereof will not be repeated.

In the steady mode, the air conditioner performs an operation for keeping the temperature at the set temperature. Hence, the steady mode is usually performed at a light load, and the rotational speed command computation unit 12c keeps the rotational speed of the variable magnetic flux motor 1 at a predetermined value (lower than that in the acceleration mode).

Thereafter, the operation mode management unit 20c changes the operation mode between the acceleration mode and the steady mode based on the change of the outdoor air temperature, the change of the set temperature by an external input and the like. When the operation mode is changed, the mode-change mode is selected, the rotational speed of and the torque of the variable magnetic flux motor drive system are reduced and the magnetization is performed in the mode-change mode.

When the magnetization is performed during the mode change, the magnetic flux command computation unit 31c computes the magnetic flux value most suitable for the succeeding operation mode based on the subsequently selected operation mode (an operation mode to be subsequently selected after the present mode-change mode), the rotational speed command output from the rotational speed command computation unit 12c and the outdoor air temperature measured by the temperature measurement unit 17, and generates the magnetic flux command Φ* corresponding to the magnetic flux value.

The other actions are the same as those in the fourth embodiment, and thus the description thereof will not be repeated.

As described above, with the variable magnetic flux motor drive system of this embodiment, in addition to the effects of the second to fourth embodiments, it is possible to control the magnetic flux value of the variable magnet to an appropriate value at the time of the mode-change mode for the acceleration mode and the steady mode of the air conditioner.

Since an excessive amount of magnetization current is supplied at the time of the magnetization, the inverter 4, which is the magnetization unit, requires a voltage higher than the normal voltage. Hence, when the rotational speed is high, there is no allowance for the output voltage, and thus it is difficult for the inverter 4 to supply the magnetization current for performing the magnetization. In order for this problem to be solved, in the variable magnetic flux motor drive system of this embodiment, the rotational speed is lowered at the time of the mode change and this reduces the voltage induced by the magnetic flux of the magnet, and thus an allowance for the voltage is obtained, and thereafter the magnetization is performed. Thus, it is possible to achieve low cost without the need for increasing both the withstand voltage of the inverter 4 and the voltage input to the inverter 4.

Since the magnetization is performed when the torque is zero (or about zero), it is possible to reduce torque shock. If the torque current is zero, it is possible to further reduce the torque shock caused by the magnetization. That is because, in equation (2) described above, unless Iq is zero, the reluctance torque greatly varies when Id is increased or decreased, and this results in the torque shock.

In the variable magnetic flux motor drive system of this embodiment, since, during the mode change, the rotational speed becomes zero such that the torque becomes zero, it is possible to reduce the torque shock when the magnetization is performed.

The reduction of the torque shock makes it possible to reduce stress imposed on the device and components, to enhance life and reliability and to reduce noise.

Figure 20:
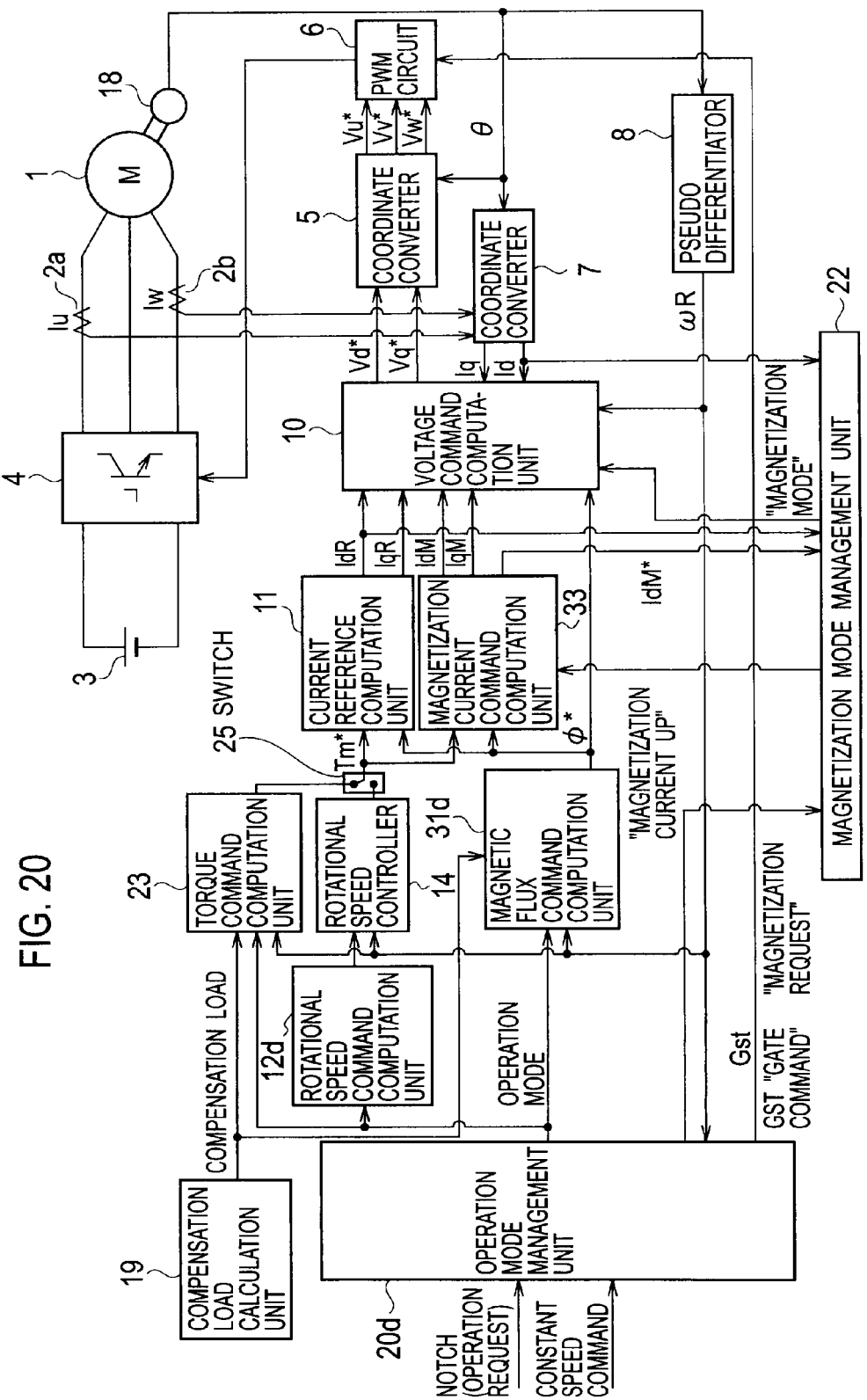
FIG. 20 is a block diagram showing the configuration of a sixth embodiment of the variable magnetic flux motor drive system of the present invention.

A sixth embodiment will now be described. FIG. 20 is a block diagram showing the configuration of the variable magnetic flux motor drive system of this embodiment. The sixth embodiment differs from the fifth embodiment in that, instead of the temperature measurement unit 17, a compensation load calculation unit 19 is provided, and a torque command computation unit 23 and a switch 25 are further provided. The variable magnetic flux motor drive system of this embodiment is applied to a train.

The compensation load calculation unit 19 calculates the compensation load (the load of passengers) in a railway car, and outputs it to a magnetic flux command computation unit 31d and the torque command computation unit 23.

Based on the operation mode selected by an operation mode management unit 20d, the torque command computation unit 23 computes the target torque of the variable magnetic flux motor 1. When the magnetic flux of the variable magnet is changed by the inverter 4, which is the magnetization unit, the torque command computation unit 23 may set the target torque of the variable magnetic flux motor 1 less than the present torque or approximately equal to zero.

The switch 25 selects, according to the operation mode selected by the operation mode management unit 20d, the torque command Tm* either from the torque command computation unit 23 or from the rotational speed controller 14, and outputs it to the current reference computation unit 11 and the magnetization current command computation unit 33.

The operation mode management unit 20d has an operation mode (acceleration mode) for accelerating the railway car (train), an operation mode (deceleration mode) for decelerating it, an operation mode (constant speed mode) for operating it at a constant speed, an operation mode (coasting mode) for coasting it and an operation mode (stop mode) for stopping it.

The magnetic flux command computation unit 31d computes the target magnetic flux value of the variable magnet according to not only the operation mode but also the compensation load (live load within the railway car) calculated by the compensation load calculation unit 19, and generates the magnetic flux command corresponding to the target magnetic flux value.

The pseudo differentiator 8 outputs the rotor rotation frequency ωR obtained by differentiating the rotation angle detected by the rotation angle sensor 18 to the rotational speed controller 14, the torque command computation unit 23, the magnetic flux command computation unit 31d, the voltage command computation unit 10 and the operation mode management unit 20d.

The other configuration is the same as that in the fifth embodiment, and thus the description thereof will not be repeated.

Figure 21:
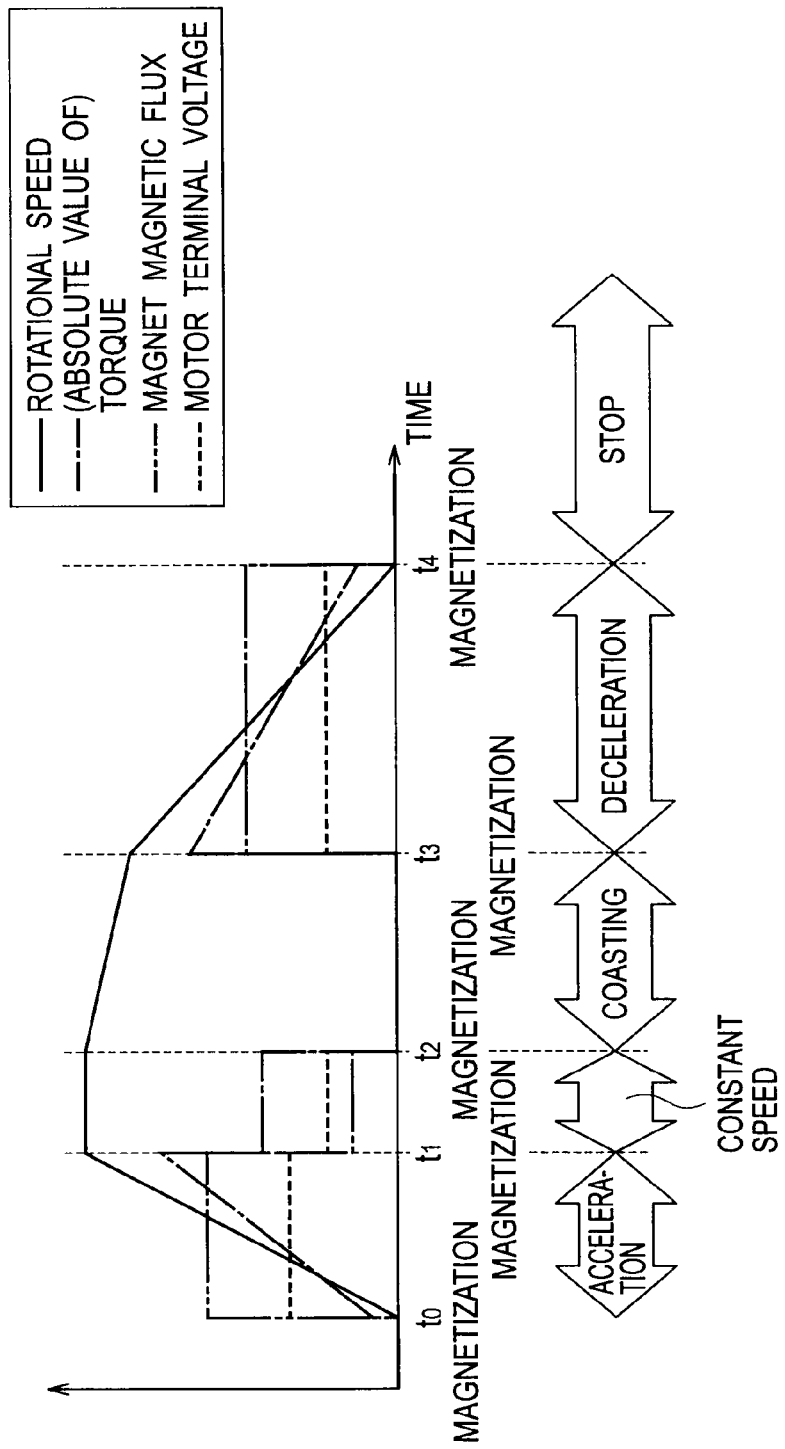
FIG. 21 is a time chart showing the controlled state of a train to which the variable magnetic flux motor drive system of the sixth embodiment is applied.

The actions of this embodiment configured as described above will now be described. FIG. 21 is a time chart showing the controlled state of the train to which the variable magnetic flux motor drive system of this embodiment is applied.

First, at time t0, a notch (an operation command) for accelerating the railway car based on the operation of a driver is input to the operation mode management unit 20d. At time t0, as in the second embodiment, an instantaneous magnetization is performed, and thereafter the operation mode management unit 20d selects the acceleration mode from among a plurality of operation modes based on the input notch.

In this embodiment, as in the embodiment described above, the magnetization is also performed at the time of the mode change of the operation mode; the magnetic flux command computation unit 31d computes the optimum magnetic flux value based on various elements. For example, when the maximum torque is required, the magnetic flux command computation unit 31d outputs the magnetic flux command corresponding to the maximum magnetic flux of the magnet, whereas, when a low or medium torque may be used, the magnetic flux value can be controlled to the optimum magnetic flux value because the amount of magnetic flux of the magnet is flexible.

In general, as the magnetic flux of the magnet is increased, the Q-axis current Iq is decreased, and an iron loss is increased. By contrast, as the magnetic flux of the magnet is decreased, the Q-axis current Iq is increased, and the iron loss is decreased. In the case of sound, as the magnetic flux of the variable magnet is increased, magnetostrictive sound (noise) is increased.

Hence, based on the information as described above, the magnetic flux command computation unit 31d has at least one of the efficiency improvement information, the safety improvement information and the noise improvement information for the variable magnetic flux motor drive system, and utilizes the information to compute the magnetic flux value most suitable for the selected operation mode.

The operation mode management unit 20d outputs the high (H) gate command Gst to the PWM circuit 6 to start the operation of the inverter 4. As a result of the selection of the acceleration mode, the switch 25 selects the torque command Tm* of the torque command computation unit 23, and outputs it to the current reference computation unit 11 and the magnetization current command computation unit 33.

As the notch input to the operation mode management unit 20d, there are a power running notch and a brake notch. The operation mode management unit 20d selects the acceleration mode according to the power running notch, and selects the deceleration mode according to the brake notch. Although the number of steps of a notch depends on the type of car, for example, the number of steps of the power running notch is four, and the number of steps of the brake notch is seven.

The notch specifies a torque pattern that depends on the rotational speed and the compensation load. However, the notch corresponds to the acceleration command rather than the torque command.

The torque command computation unit 23 computes, based on the acceleration mode selected by the operation mode management unit 20d, the target torque of the variable magnetic flux motor 1, and outputs the torque command Tm* corresponding to the computation result to the switch 25. Specifically, the torque command computation unit 23 generates the torque command Tm* according to the notch, the rotational speed and the compensation load. In other words, the torque command computation unit 23 increases or decreases the torque command Tm* according to the compensation load such that the acceleration corresponding to the notch is obtained.

As shown in FIG. 21, in the acceleration range, the variable magnetic flux motor 1 is controlled to gradually increase the rotational speed at a predetermined torque.

The magnetic flux command computation unit 31d computes the target magnetic flux value of the variable magnet based on the operation mode selected by the operation mode management unit 20d, the rotor rotation frequency ωR output from the pseudo differentiator 8 and the compensation load calculated by the compensation load calculation unit 19, and generates the magnetic flux command Φ* corresponding to the target magnetic flux value.

The other actions in the acceleration mode are the same as those in, for example, the acceleration mode in the third embodiment, and thus the description thereof will not be repeated.

When a constant speed command is input (time t1), the operation mode management unit 20d selects the constant speed mode from among a plurality of operation modes, and outputs it.

In the constant speed mode, the variable magnetic flux motor 1 does not need a large torque, but needs to maintain the rotational speed. Hence, instead of the torque command computation unit 23, the rotational speed controller 14 outputs the torque command Tm*. In other words, in the constant speed mode, a rotational speed command computation unit 12d and the rotational speed controller 14 are effective.

Thus, as a result of the selection of the constant speed mode, the switch 25 selects the torque command Tm* of the rotational speed controller 14, and outputs it to the current reference computation unit 11 and the magnetization current command computation unit 33.

At time t1, the magnetic flux command computation unit 31d computes the instantaneously optimum magnetic flux value, and generates the magnetic flux command Φ* corresponding to this magnetic flux value to perform the magnetization.

The rotational speed command computation unit 12d computes, based on the constant speed mode selected by the operation mode management unit 20d, the target rotational speed of the variable magnetic flux motor 1, and outputs the rotational speed command corresponding to the computation result to the rotational speed controller 14.

Based on the rotational speed command output from the rotational speed command computation unit 12d and the rotor rotation frequency ωR output from the pseudo differentiator 8, the rotational speed controller 14 outputs, to the switch 25, the torque command Tm* which is generated such that the rotational speed of the variable magnetic flux motor 1 agrees with the target rotational speed (speed).

The magnetic flux command computation unit 31d computes the target magnetic flux value of the variable magnet based on the constant speed mode selected by the operation mode management unit 20d and the compensation load calculated by the compensation load calculation unit 19 (and the rotational speed if needed), and generates the magnetic flux command Φ* corresponding to the target magnetic flux value.

The other actions in the constant speed mode are the same as those in the other embodiments, and thus the description thereof will not be repeated.

When both the notch and the constant speed command are off (are not input), the operation mode management unit 20d selects the coasting mode from among a plurality of operation modes and outputs it (time t2). This coasting mode is a mode in which, while the train travels at a certain speed, it travels by inertia under a zero torque state of the variable magnetic flux motor 1.

When the inverter 4 stops in the coasting mode and the variable magnet has the magnetic flux, an induced voltage is generated at the terminals of the motor. Here, even when the variable magnetic flux motor drive system is in the coasting mode, the speed of the car may be maintained or increased by the driving of another motor or a gradient. In this case, when the inverter 4 is at rest, the magnetic flux value cannot be controlled, and thus the induced voltage between the motor terminals is increased. When the line-to-line peak value of the induced voltage becomes equal to or more than the DC voltage of the inverter 4, a brake force disadvantageously acts on the variable magnetic flux motor 1.

The increased induced voltage may apply an overvoltage more than the withstand voltage to the inverter 4.

Hence, at time t2, the magnetic flux command computation unit 31d generates the magnetic flux command Φ* for performing control with an instantaneous small amount of magnetic flux (or zero), and thereby performs the magnetization. In this embodiment, in coasting during the period from time t2 to time t3, since, for example, the stop of the inverter 4 keeps the magnetic flux value of the magnet at zero, it is possible to solve the problem resulting from the induced voltage.

When the inverter 4 is stopped in the coasting mode, the torque is zero and the rotational speed is not controlled, and thus it is unnecessary for the rotational speed controller 14 or the torque command computation unit 23 to output the torque command Tm*.

When the operation of the inverter 4 is continued in the coasting mode, the torque command computation unit 23 outputs the torque command Tm* for controlling the torque to zero.

The other actions in the coasting mode are the same as those in the other embodiments, and thus the description thereof will not be repeated.

At time t3, a brake notch (an operation command) for decelerating the railway car based on the operation of the driver is input to the operation mode management unit 20d. At time t3, an instantaneous magnetization for the magnetic flux value most suitable for the deceleration is performed, and thereafter the operation mode management unit 20d selects the deceleration mode from among a plurality of operation modes based on the input notch.

As a result of the selection of the deceleration mode, the switch 25 selects the torque command Tm* of the torque command computation unit 23, and outputs it to the current reference computation unit 11 and the magnetization current command computation unit 33.

The torque command computation unit 23 computes the target torque of the variable magnetic flux motor 1 based on the deceleration mode selected by the operation mode management unit 20d, and outputs the torque command Tm* corresponding to the computation result to the switch 25. Specifically, the torque command computation unit 23 generates the torque command Tm* according to the notch, the rotational speed and the compensation load. In other words, the torque command computation unit 23 increases or decreases the torque command Tm* according to the compensation load such that the deceleration corresponding to the notch is obtained.

As shown in FIG. 21, in the acceleration range, the variable magnetic flux motor 1 is controlled to gradually decrease the rotational speed at a predetermined torque.

The other actions in the deceleration mode are the same as those in, for example, the deceleration mode in the third embodiment, and thus the description thereof will not be repeated.

Thereafter, the magnetic flux command computation unit 31d magnetizes the magnet such that the magnetic flux thereof is zero or a sufficiently small value, and then, at time t4 when the rotational speed becomes zero, the operation mode management unit 20d selects the stop mode from among a plurality of operation modes. The respective units of the variable magnetic flux motor drive system perform processing necessary for the stop thereof, and then stop.

When the inverter 4 cannot be activated due to its failure while the system is at rest, if another drive device can operate, the train can accelerate. Here, if the variable magnet of the variable magnetic flux motor 1 has a magnetic flux value, an induced voltage is produced. Hence, disadvantageously, as in the coasting mode described above, a brake force may act or the inverter 4 may fail. If the inverter 4 is short-circuited, a short-circuit current continuously flows, and thus the motor inverter burns. The magnetic flux value of the magnet is lowered when the mode is changed to the stop mode (time t4) because the above-described problems are avoided, and thus the safety is secured.

When the acceleration is performed again, the magnetic flux command computation unit 31d outputs the magnetic flux command Φ* for performing the magnetization again to increase the magnetic flux immediately before entering the acceleration mode.

The other actions are the same as those in the second to fifth embodiments, and thus the description thereof will not be repeated.

Figure 22:
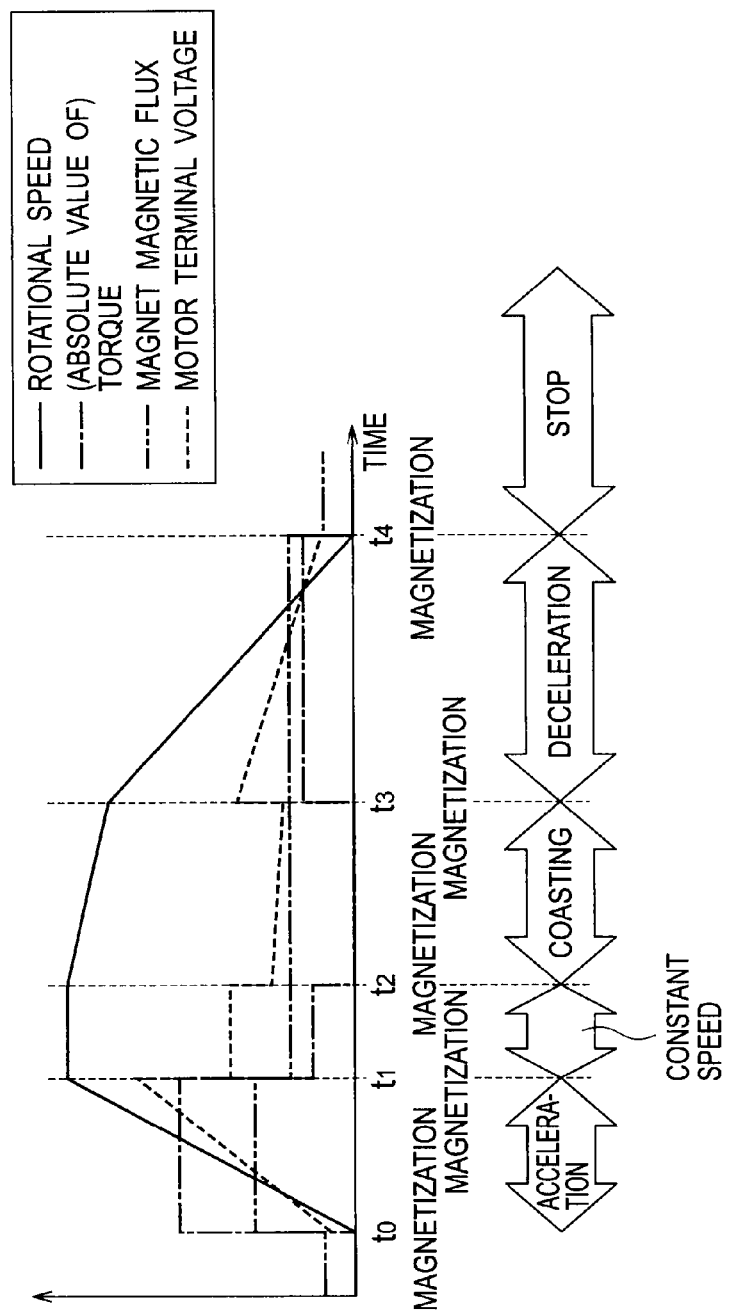
FIG. 22 is another time chart showing the controlled state of the train to which the variable magnetic flux motor drive system of the sixth embodiment is applied.

FIG. 22 is another time chart showing the controlled state of the train to which the variable magnetic flux motor drive system of this embodiment is applied. This case differs from that of FIG. 21 in that, in the coasting mode (from time t2 to time t3), the magnetic flux value of the magnet does not become zero, and remains the same in the constant speed mode and the deceleration mode before and after the coasting mode, and that, in the stop mode (after time t4), the magnetic flux of the magnet does not become zero, and is kept equal to a small value.

In this case, although time t2 and time t3 are timing with which the magnetization is performed, it is actually unnecessary to perform the magnetization. The magnetic flux command computation unit 31d preferably magnetizes the magnet such that the magnetic flux thereof has a small value when the mode is changed to the constant speed mode (time t1).

FIG. 22 is a diagram in which a rotational speed sensorless control is considered to be applied to the variable magnetic flux motor drive system. Although the normal variable magnetic flux motor 1 is provided with a speed sensor, such as the rotation angle sensor 18, for accurately controlling the torque generated, the rotational speed sensorless control may be performed in terms of cost of the sensor and its interface circuit, a space where it is fitted to the motor, reliability resulting from the reduction in the number of components, the number of steps for wiring and the like.

In the rotational speed sensorless control, the rotational speed and the rotation angle are estimated based on the induced voltage proportional to the rotational speed. Hence, in the variable magnetic flux motor drive system to which the rotational speed sensorless control is applied, even when it is restarted, an initial phase is determined based on the induced voltage. However, as shown in FIG. 21, if, in the coasting mode or the stop mode, the magnetic flux of the magnet is made zero, the variable magnetic flux motor 1 does not generate an induced voltage, and thus it is not preferable in terms of safety at the time of the restart.

Hence, in the variable magnetic flux motor drive system to which the rotational speed sensorless control is applied, as shown in FIG. 22, in the coasting mode or the stop mode, the safety is secured by preventing the magnetic flux of the magnet from being made zero and maintaining a low magnetic flux value.

As described above, in the coasting mode, the inverter 4 may not be stopped. In particular, in the variable magnetic flux motor drive system to which the rotational speed sensorless control is applied, the inverter 4 may not be stopped even in coasting. Hence, the direction of the magnetic flux of the magnet is estimated from information on the induced voltage, and thus the magnetic flux is prevented from being made zero and a low magnetic flux value is maintained.

As described above, with the variable magnetic flux motor drive system of this embodiment, in addition to the effects of the second to fifth embodiments, it is possible to control the magnetic flux value of the variable magnet to an appropriate value when the operation mode is changed in each of the acceleration mode, the constant speed mode, the coasting mode, the deceleration mode and the stop mode of the train (railway car).

Since, in the coasting mode or the stop mode where a torque is not required, the magnetic flux value is made zero or a small value, it is possible not only to prevent the brake force caused by the induced voltage from being produced and to prevent an overvoltage from being applied to the inverter 4 but also to reduce the iron loss, and there are effects in terms of both safety and efficiency.

Figure 23:
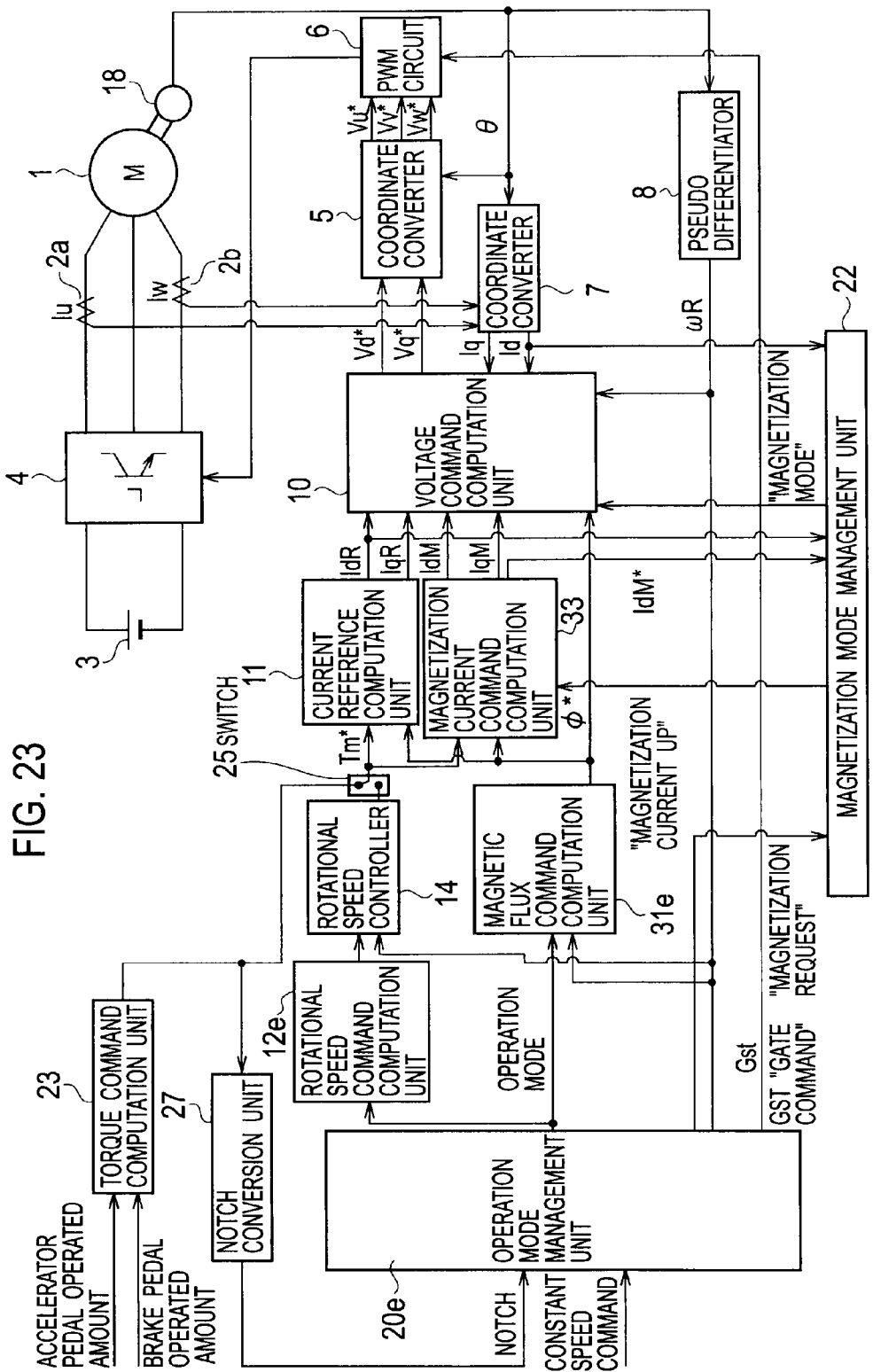
FIG. 23 is a block diagram showing the configuration of a seventh embodiment of the variable magnetic flux motor drive system of the present invention.

A seventh embodiment will now be described. FIG. 23 is a block diagram showing the configuration of the variable magnetic flux motor drive system of this embodiment. The seventh embodiment differs from the sixth embodiment in that the compensation load calculation unit 19 is omitted, and a notch conversion unit 27 is provided between the torque command computation unit 23 and an operation mode management unit 20e. The variable magnetic flux motor drive system of this embodiment is applied to an electric car or a hybrid car.

The torque command computation unit 23 computes the target torque of the variable magnetic flux motor 1 based on an accelerator pedal operated amount or a brake pedal operated amount in an electric car or a hybrid car.

The notch conversion unit 27 divides, based on the torque command Tm* output from the torque command computation unit 23, the torque into levels in a stepwise manner and coverts it into the corresponding notch, and outputs it to the operation mode management unit 20e. The notch in this embodiment refers to a discretized state quantity as in the notch of the train in the sixth embodiment.

In this embodiment, when the accelerator pedal is depressed, there is provided a four-step power running notch that includes P4 ranging from 100% torque to 75% torque, P3 ranging from 75% torque to 50% torque, P2 ranging from 50% torque to 25% torque and P1 ranging from 25% torque to 0% torque.

When the brake pedal is depressed, there is provided a four-step brake notch that includes B1 ranging from 0% torque to 25% torque, B2 ranging from 25% torque to 50% torque, B3 ranging from 50% torque to 75% torque and B4 ranging from 75% torque to 100% torque.

The switch 25 selects, according to the operation mode selected by the operation mode management unit 20e, the torque command Tm* output either from the torque command computation unit 23 or from the rotational speed controller 14, and outputs it to the current reference computation unit 11 and the magnetization current command computation unit 33.

The operation mode management unit 20e has an operation mode (acceleration mode) for accelerating an electric car or a hybrid car, an operation mode (deceleration mode) for decelerating it, an operation mode (constant speed mode) for operating it at a constant speed and an operation mode (stop mode) for stopping it.

The operation mode management unit 20e may also have an operation mode (coasting mode) for coasting an electric car or a hybrid car. The operation mode management unit 20e has P4 mode, P3 mode, P2 mode and P1 mode corresponding to individual notches even in the acceleration mode, and has B1 mode, B2 mode, B3 mode and B4 mode corresponding to individual notches even in the deceleration mode.

The operation mode management unit 20e selects the operation mode corresponding to the torque computed by the torque command computation unit 23.

The other configuration is the same as that in the sixth embodiment, and thus the description thereof will not be repeated.

Figure 24:
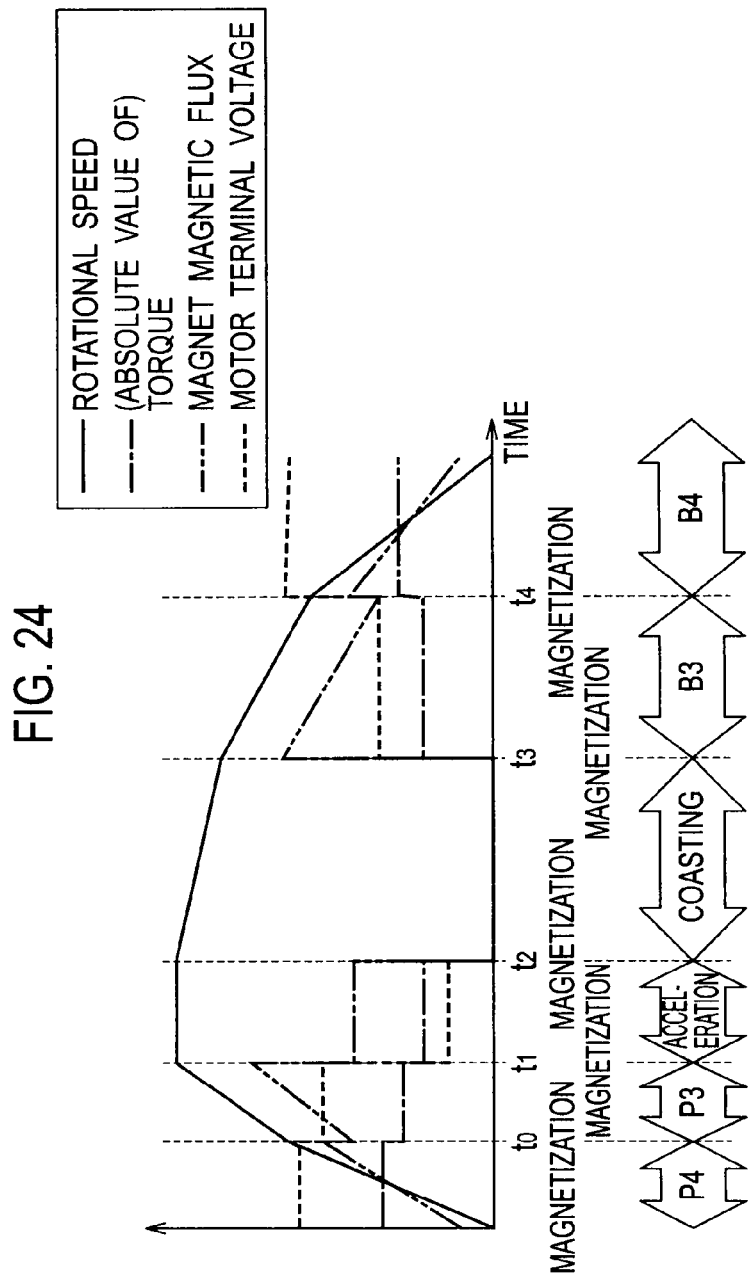
FIG. 24 is a time chart showing the controlled state of an electric car or a hybrid car to which the variable magnetic flux motor drive system of the seventh embodiment is applied.

The actions of this embodiment configured as described above will now be discussed. FIG. 24 is a time chart showing the controlled state of an electric car or a hybrid car to which the variable magnetic flux motor drive system of this embodiment is applied.

The driver first depresses the accelerator pedal to accelerate an electric car or a hybrid car. Here, if the operated amount corresponds to 80% torque, the torque command computation unit 23 outputs the corresponding torque command Tm* to the switch 25 and the notch conversion unit 27.

Based on the torque command Tm*, the notch conversion unit 27 outputs the notch P4 corresponding to 80% torque to the operation mode management unit 20e.

Based on the input notch P4, the operation mode management unit 20e selects the P4 mode from among a plurality of operation modes.

The operation mode management unit 20e also outputs the high (H) gate command Gst to the PWM circuit 6 to start the operation of the inverter 4. As a result of the selection of the P4 mode, the switch 25 selects the torque command Tm* of the torque command computation unit 23, and outputs it to the current reference computation unit 11 and the magnetization current command computation unit 33.

Figure 25:
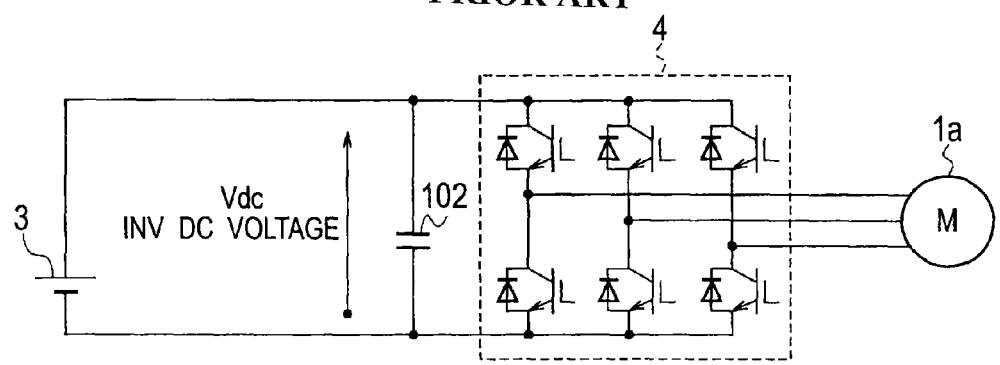
FIG. 25 is a block diagram showing the configuration of a conventional variable magnetic flux motor drive system.

As shown in FIG. 25, in the P4 range, the variable magnetic flux motor 1 is controlled to gradually increase the rotational speed at a predetermined torque.

If the operated amount corresponds to 60% torque at time t0, the torque command computation unit 23 outputs the corresponding torque command Tm* to the switch 25 and the notch conversion unit 27.

Based on the torque command Tm*, the notch conversion unit 27 outputs the notch P3 corresponding to 60% torque to the operation mode management unit 20e.

Based on the input notch P3, the operation mode management unit 20e selects the P3 mode from among a plurality of operation modes.

In this embodiment, as in the embodiments described above, a magnetic flux command computation unit 31e also performs the magnetization when the operation mode is changed. The variable magnetic flux motor drive system of this embodiment basically performs the same control as the train of the sixth embodiment.

As shown in FIG. 25, in the P3 range, the variable magnetic flux motor 1 is controlled to gradually increase the rotational speed at a predetermined torque lower than that in the P4 range.

The magnetic flux command computation unit 31e computes the target magnetic flux value of the variable magnet based on the operation mode selected by the operation mode management unit 20e and the rotor rotation frequency ωR output from the pseudo differentiator 8, and generates the magnetic flux command Φ* corresponding to the target magnetic flux value.

The other actions in the acceleration mode are the same as those in the acceleration mode in the sixth embodiment, and thus the description thereof will not be repeated.

When the constant speed command is input (time t1), the operation mode management unit 20e selects the constant speed mode from among a plurality of operation modes and outputs it. The operation mode management unit 20e itself may select the constant speed mode based on the rotational speed and the notch.

In the constant speed mode, the variable magnetic flux motor 1 does not need a large amount of torque, but needs to maintain the rotational speed. Hence, instead of the torque command computation unit 23, the rotational speed controller 14 outputs the torque command Tm*. In other words, in the constant speed mode, a rotational speed command computation unit 12e and the rotational speed controller 14 are effective.

Thus, as a result of the selection of the constant speed mode, the switch 25 selects the torque command Tm* of the rotational speed controller 14, and outputs it to the current reference computation unit 11 and the magnetization current command computation unit 33.

In addition to the constant speed mode, even in an automatic operation, the rotational speed controller 14 may control the rotational speed.

The other actions in the constant speed mode are the same as those in the sixth embodiment, and thus the description thereof will not be repeated.

When the notch and the constant speed command are both off (not input), the operation mode management unit 20e selects the coasting mode from among a plurality of operation modes and outputs it (time t2). Although it is difficult to consider the situation where the accelerator pedal and the brake pedal are not depressed when the automobile is operated, when, for example, a hybrid car is controlled by an engine, the variable magnetic flux motor drive system probably selects the coasting mode.

The other actions in the coasting mode are the same as those in the sixth embodiment, and thus the description thereof will not be repeated.

At time t3, the driver depresses the brake pedal to perform deceleration. Here, when the operated amount corresponds to −70% torque, the torque command computation unit 23 outputs the corresponding torque command Tm* to the switch 25 and the notch conversion unit 27.

Based on the torque command Tm*, the notch conversion unit 27 outputs the notch B3 corresponding to −70% torque to the operation mode management unit 20e.

Based on the input notch B3, the operation mode management unit 20e selects the B3 mode from among a plurality of operation modes.

At time t3 when deceleration is performed, the magnetization is instantaneously performed such that the optimum magnetic flux value is obtained. As a result of the selection of the deceleration mode, the switch 25 selects the torque command Tm* of the torque command computation unit 23, and outputs it to the current reference computation unit 11 and the magnetization current command computation unit 33.

As shown in FIG. 25, in the B3 range, the variable magnetic flux motor 1 is controlled to gradually decrease the rotational speed at a predetermined torque.

The other actions in the B3 and B4 modes are the same as those in the deceleration mode in the sixth embodiment, and thus the description thereof will not be repeated.

As described above, with the variable magnetic flux motor drive system of this embodiment, in addition to the effects of the second to sixth embodiments, it is possible to control the magnetic flux value of the variable magnet to an appropriate value when the operation mode is changed in each of the acceleration mode, the constant speed mode, the coasting mode, the deceleration mode and the stop mode of an electric car or a hybrid car.

Since the torques corresponding to the operated amounts of the accelerator pedal and the brake pedal are converted into the notches in a stepwise manner, and thus the operation mode corresponding to the operated amount is selected, it is possible to perform the magnetization based on the operation mode such that the magnetic flux value of the variable magnet is controlled to the optimum magnetic flux value corresponding to the operated amount.

The variable magnetic flux motor drive system of the present invention can be applied also to a cleaner. In this case, the operation mode management unit can be considered to have, for example, strong and weak modes that are commands to the cleaner.

INDUSTRIAL APPLICABILITY

The variable magnetic flux motor drive system according to the present invention can be applied to variable magnetic flux motor drive systems using a drive motor, such as washing machines, elevators, railway cars and electric cars.

The invention claimed is:

1. A motor drive system comprising:
   an inverter for driving a motor having a rotor in which a low-coercive permanent magnet is embedded;
   a rotation angle sensor for detecting a rotation angle of the rotor;
   a boost circuit for boosting a DC voltage, to be supplied to the inverter, from a first voltage value to a second voltage value so as to vary magnetic flux of the low-coercive permanent magnet; and
   a controller for controlling the boost circuit to boost the DC voltage value to the second voltage value when varying the magnetic flux of the low-coercive permanent magnet, and controlling the inverter to generate magnetization current when boosting the DC voltage value to the second voltage value is completed,
   wherein the controller calculates a rotation speed of the rotor based on the rotation angle, calculates a magnetization current value for the magnetization current based on a target value of magnetic flux for a present magnetic flux of the low-coercive permanent magnet existing when the magnetic flux of the low-coercive permanent magnet is to be varied, and sets the second voltage value by referring to a table, in which a plurality of voltage values corresponding to plural stored sets of magnetization current values and rotation speeds, using the calculated magnetization current value and the calculated rotation speed.

2. The motor drive system according to claim 1, wherein the second voltage value set by the controller increases as the rotation speed increases.

3. The motor drive system according to claim 1, wherein the boost circuit is a DC chopper circuit, and the controller controls the DC chopper circuit to perform switching operation when varying the magnetic flux of the low-coercive permanent magnet.

4. The motor drive system according to claim 1, further comprising
   a high-coercive-force permanent magnet embedded in the rotor,
   wherein, the voltage values stored in the table are set within a reversible region of the high-coercive-force permanent magnet.

5. The motor drive system according to claim 1, further comprising:
   a voltage detector for detecting a DC voltage of a DC source, wherein the controller compares the DC voltage detected by the voltage detector with the second voltage value and, when the DC voltage detected by the voltage detector is equal-to or larger-than the second voltage value, does not control the boost circuit to boost the DC voltage of the DC source.

6. The motor drive system according to claim 5, wherein the DC source is a battery unit.

7. The motor drive system according to claim 1,
   wherein the low-coercive permanent magnet is embedded in the rotor so that direction of magnetic flux of the low-coercive permanent magnet is perpendicular to Q-axis direction of the rotor, and the magnetic flux of the low-coercive permanent magnet is varied by a D-axis current of the magnetization current generated by the inverter.

8. A method for varying a magnetic flux of low-coercive permanent magnet embedded in a rotor of a motor comprising:
   detecting a rotation angle of the rotor;
   instructing a boost circuit so as to boost a DC voltage from a first voltage value to a second voltage value when varying the magnetic flux of low-coercive permanent magnet;
   calculating a rotation speed of the rotor based on the detected rotation angle,
   calculating a magnetization current value for the magnetization current based on a target value of magnetic flux for a present magnetic flux of the low-coercive permanent magnet existing when the magnetic flux of the low-coercive permanent magnet is to be varied;
   setting the second voltage value by referring to a table, in which a plurality of voltage values corresponding to plural stored sets of magnetization current values and rotation speeds, using the calculated magnetization current value and the calculated rotation speed;
   boosting, by the boost circuit, the DC voltage value to the second voltage value when instructed; and
   instructing an inverter to generate magnetization current having the magnetization current value for varying the magnetic flux of the low-coercive permanent magnet when boosting the DC voltage value to the second voltage value by the boost circuit is completed.

9. The method according to claim 8, further comprising;
   calculating a rotation speed based on a rotation angle of the rotor detected by a rotation angle sensor and setting the second voltage value used for boosting the DC voltage at the first voltage value based on the magnetization current value and the calculated rotation speed.

10. The method according to claim 9, wherein the second voltage value increases as the magnetization current value increases.

11. The method according to claim 9, wherein the second voltage value increases as the rotation speed increases.

12. The method according to claim 9, wherein, the voltage values stored in the table are set within a reversible region of a high-coercive-force permanent magnet.

13. The method for varying a magnetic flux according to claim 8, wherein said instructing the boost circuit step boosts the DC voltage value to the second voltage value when rotational speed of the motor is increased.

14. The method for varying a magnetic flux according to claim 8, wherein said instructing the boost circuit step boosts the DC voltage value to the second voltage value when torque of the motor is increased.

15. The method for varying a magnetic flux according to claim 8, wherein said instructing the boost circuit step boosts the DC voltage value to the second voltage value when a modulation factor of the motor is increased.

16. The method for varying a magnetic flux according to claim 8, further comprising:
   detecting a DC voltage of a DC source, and
   comparing the detected DC voltage with the second voltage, wherein, when the detected DC voltage is equal-to or larger-than the second voltage value, the boost circuit doesn't boost the DC voltage of the DC source.

* * * * *